United States Patent
Kang et al.

(10) Patent No.: US 12,056,844 B2
(45) Date of Patent: Aug. 6, 2024

(54) METHOD AND APPARATUS WITH IMAGE PROCESSING

(71) Applicant: Samsung Electronics Co., Ltd., Suwon-si (KR)

(72) Inventors: Byong Min Kang, Yongin-si (KR); Dong Kyung Nam, Yongin-si (KR); Yang Ho Cho, Seongnam-si (KR); Jingu Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 17/748,180

(22) Filed: May 19, 2022

(65) Prior Publication Data
US 2023/0060314 A1    Mar. 2, 2023

(30) Foreign Application Priority Data
Aug. 31, 2021   (KR) .................. 10-2021-0115912

(51) Int. Cl.
*G06T 3/4015*   (2024.01)
*G06T 3/4053*   (2024.01)
(Continued)

(52) U.S. Cl.
CPC .......... *G06T 3/4015* (2013.01); *G06T 3/4053* (2013.01); *H04N 23/12* (2023.01);
(Continued)

(58) Field of Classification Search
None
See application file for complete search history.

(56) References Cited

U.S. PATENT DOCUMENTS

| 8,629,930 B2 | 1/2014 | Brueckner et al. |
| 2012/0176506 A1* | 7/2012 | Tajiri .................. H04N 13/144 348/222.1 |

(Continued)

FOREIGN PATENT DOCUMENTS

| CN | 106303228 A | 1/2017 |
| CN | 108230273 A | 6/2018 |

(Continued)

*Primary Examiner* — Paul M Berardesca
(74) *Attorney, Agent, or Firm* — NSIP Law

(57) ABSTRACT

A method with image processing includes: receiving an input image including Bayer images captured by a plurality of lenses included in a lens assembly; generating channel separation images by separating each of the Bayer images by a plurality of channels; determining corresponding points such that pixels in the channel separation images are displayed at the same position on a projection plane, for each of the plurality of lenses; performing binning on the channel separation images, based on a brightness difference and a distance difference between a target corresponding point and a center of a pixel including the target corresponding point, corresponding to each of the corresponding points in channel separation images that correspond to a same channel and that are combined into one image, for each of the plurality of lenses; restoring the input image for each of the plurality of lenses based on binned images generated by performing the binning; and outputting the restored input image.

27 Claims, 18 Drawing Sheets

(51) Int. Cl.
*H04N 23/12* (2023.01)
*H04N 23/84* (2023.01)
*H04N 23/951* (2023.01)
*H04N 23/957* (2023.01)
*H04N 25/13* (2023.01)

(52) U.S. Cl.
CPC ........... *H04N 23/84* (2023.01); *H04N 23/951* (2023.01); *H04N 23/957* (2023.01); *H04N 23/843* (2023.01); *H04N 25/134* (2023.01)

(56) References Cited

U.S. PATENT DOCUMENTS

| | | | | |
|---|---|---|---|---|
| 2012/0287329 | A1* | 11/2012 | Yahata | G06T 5/50 348/E5.042 |
| 2014/0146201 | A1* | 5/2014 | Knight | G02B 27/0075 348/222.1 |
| 2018/0262734 | A1* | 9/2018 | Kumar | G02B 3/0056 |

FOREIGN PATENT DOCUMENTS

| | | | |
|---|---|---|---|
| KR | 10-2019-0053074 | A | 5/2019 |
| KR | 10-2038680 | B1 | 10/2019 |
| KR | 10-2020-0069024 | A | 6/2020 |

* cited by examiner

METHOD AND APPARATUS WITH IMAGE PROCESSING

CROSS-REFERENCE TO RELATED APPLICATIONS

This application claims the benefit under 35 USC § 119(a) of Korean Patent Application No. 10-2021-0115912, filed on Aug. 31, 2021 in the Korean Intellectual Property Office, the entire disclosure of which is incorporated herein by reference for all purposes.

BACKGROUND

1. Field

The following disclosure relates to a method and apparatus with image processing.

2. Description of Related Art

To generate a high-resolution image, matching between low-resolution images of multiple frames may be performed. Matching between images may be performed through a process of finding a corresponding point corresponding to a pixel of a position in which a subject is captured in each low-resolution image and matching a position of the corresponding point to a reference low-resolution image. To find a position of a corresponding point, a neural network, such as a convolutional neural network (CNN), or image warping may be used. However, an amount of computational operation may greatly increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image processing includes: receiving an input image including Bayer images captured by a plurality of lenses included in a lens assembly; generating channel separation images by separating each of the Bayer images by a plurality of channels; determining corresponding points such that pixels in the channel separation images are displayed at the same position on a projection plane, for each of the plurality of lenses; performing binning on the channel separation images, based on a brightness difference and a distance difference between a target corresponding point and a center of a pixel including the target corresponding point, corresponding to each of the corresponding points in channel separation images that correspond to a same channel and that are combined into one image, for each of the plurality of lenses; restoring the input image for each of the plurality of lenses based on binned images generated by performing the binning; and outputting the restored input image.

The determining of the corresponding points may include determining the corresponding points of the pixels based on an optical flow in the channel separation images.

The determining of the corresponding points may include determining the corresponding points of the pixels for each of the plurality of lenses based on depth information and calibration information for each of the plurality of lenses.

The determining of the corresponding points may include: calling a lookup table (LUT) that stores corresponding points of a portion of the pixels at a predetermined distance among the pixels, for each of the plurality of lenses; and determining the corresponding points of the pixels by interpolating the corresponding points of the portion of the pixels stored in the LUT.

The performing of the binning may include performing binning on the channel separation images based on a probability value according to characteristics of the corresponding points comprising the distance difference and the brightness difference in the channel separation images that correspond to the same channel and that are combined into the one image, for each of the plurality of lenses.

The performing of the binning may include: determining a weight based on the distance difference and the brightness difference, or based on a gradient difference between the center of the pixel and the target corresponding point, the distance difference and the brightness difference, corresponding to each of the corresponding points in the channel separation images combined into the one image, for each of the plurality of lenses; and determining a weighted average of the corresponding points for each of the plurality of lenses, based on the weight.

The restoring of the input image may include: generating a second Bayer image by combining the binned images for each channel, corresponding to the plurality of lenses; and restoring the input image to a color image by interpolating a color for each of pixels of the second Bayer image.

The generating of the second Bayer image may include generating the second Bayer image by combining channels of the binned images so that each of the channels of the binned images has a Bayer pattern.

The method may include restoring a resolution by up-sampling the binned images for each of the plurality of lenses, wherein the restoring of the input image may include: generating a second Bayer image by combining images with the restored resolution; and restoring the input image to a color image by interpolating a color for each of pixels of the second Bayer image.

The generating of the channel separation images may include separating each of the Bayer images by the plurality of channels by placing each of the Bayer images in corresponding pixels for each of a plurality of channels included in a Bayer pattern.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with image processing includes: a communication interface configured to receive an input image including Bayer images captured by a plurality of lenses included in a lens assembly; one or more processors configured to generate channel separation images by separating each of the Bayer images by a plurality of channels, determine corresponding points such that pixels in the channel separation images are displayed at the same position on a projection plane, for each of the plurality of lenses, perform binning on the channel separation images, based on a brightness difference and a distance difference between a target corresponding point and a center of a pixel including the target corresponding point, corresponding to each of the corresponding points in channel separation images that correspond to a same channel and that are combined into one image, for each of the plurality of lenses, and restore the input image for each of the plurality of lenses based on binned images generated by performing the binning; and a display configured to output the restored input image.

For the determining of the corresponding points, the one or more processors may be configured to determine the corresponding points of the pixels for each of the plurality of lenses based on depth information and calibration information for each of the plurality of lenses.

For the determining of the corresponding points, the one or more processors may be configured to: call a lookup table (LUT) that stores corresponding points of a portion of the pixels at a predetermined distance among the pixels, for each of the plurality of lenses; and determine the corresponding points of the pixels by interpolating the corresponding points of the portion of the pixels stored in the LUT.

For the performing of the binning, the one or more processors may be configured to perform binning on the channel separation images based on a probability value according to characteristics of the corresponding points comprising the distance difference and the brightness difference in the channel separation images that correspond to the same channel and that are combined into the one image, for each of the plurality of lenses.

For the performing of the binning, the one or more processors may be configured to: determine a weight based on the distance difference and the brightness difference, or based on a gradient difference between the center of the pixel and the target corresponding point, the distance difference and the brightness difference, corresponding to each of the corresponding points in the channel separation images combined into the one image, for each of the plurality of lenses; and determine a weighted average of the corresponding points for each of the plurality of lenses, based on the weight.

For the restoring of the input image, the one or more processors may be configured to: generate a second Bayer image by combining the binned images for each channel, corresponding to the plurality of lenses; and restore the input image to a color image by interpolating a color for each of pixels of the second Bayer image.

The one or more processors may be configured to: restore a resolution by up-sampling the binned images for each of the plurality of lenses; and for the restoring of the input image, generate a second Bayer image by combining images with the restored resolution; and restore the input image to a color image by interpolating a color for each of pixels of the second Bayer image.

In another general aspect, a method with image processing includes: determining a plurality of images, wherein each image corresponds to a different lens among a plurality of lenses; determining corresponding points corresponding to a same portion of an image subject in each of the images; for each of the images, determining one or more differences between the corresponding point of the image and a center of a pixel of the image including the corresponding point; and generating a restored input image by performing binning on the images based on the determined differences.

For each of the images, the one or more differences may include any one or any combination of any two or more of a brightness difference, a distance difference, and a gradient difference.

For each of the images, the determining of the one or more differences may include: determining the brightness difference and the distance difference in response to a distance from the image subject to the lenses being within a range of a focal point of the lenses; and determining the brightness difference, the distance difference, and the gradient difference in response to the distance from the image subject to the lenses being outside the range.

The method may include determining a weighted average based on the one or more differences determined for the images, wherein the performing of the binning may include performing the binning based on the determined weighted average.

The lenses may be included in an array lens camera (ALC), and the images correspond to a same color channel.

The determining of the images may include determining the images using any one or any combination of any two or more of a red-green-blue (RGB) sensor, a black-and-white (BW) sensor, an infrared (IR) sensor, and an ultraviolet (UV) sensor corresponding to the lenses.

In another general aspect, a method with image processing includes: determining a plurality of images of a subject at a distance from an array lens camera (ALC), wherein each image corresponds to a different lens among lenses of the ALC; determining corresponding points corresponding to a same portion of the subject in each of the images, based a predetermined corresponding points of a look up table (LUT); and generating a restored input image by performing binning based on the determined corresponding points.

The distance may be greater than a first distance from the ALC and less than a second distance from the ALC, and the predetermined corresponding points of the LUT may include first corresponding points corresponding to a same portion of a subject at the first distance in each of a plurality of first images and second corresponding points corresponding to a same portion of a subject at the second distance in each of a plurality of second images.

The determining of the corresponding points may include interpolating the first corresponding points and the second corresponding points.

Other features and aspects will be apparent from the following detailed description, the drawings, and the claims.

Figure 1:
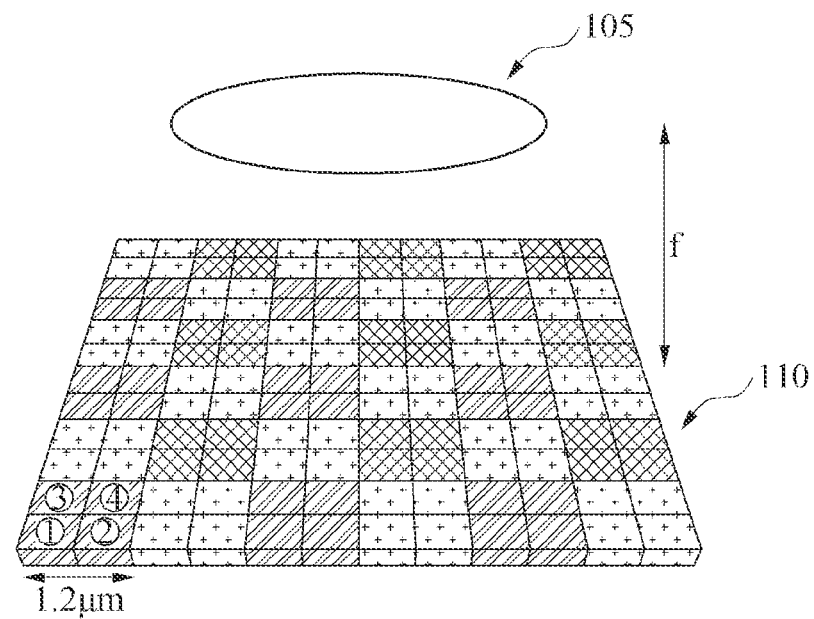
FIG. 1 illustrates an example of a pixel structure of an image sensor corresponding to a lens of an array lens camera, and a pixel structure of an image sensor corresponding to a lens of a general camera.
Figure 1:
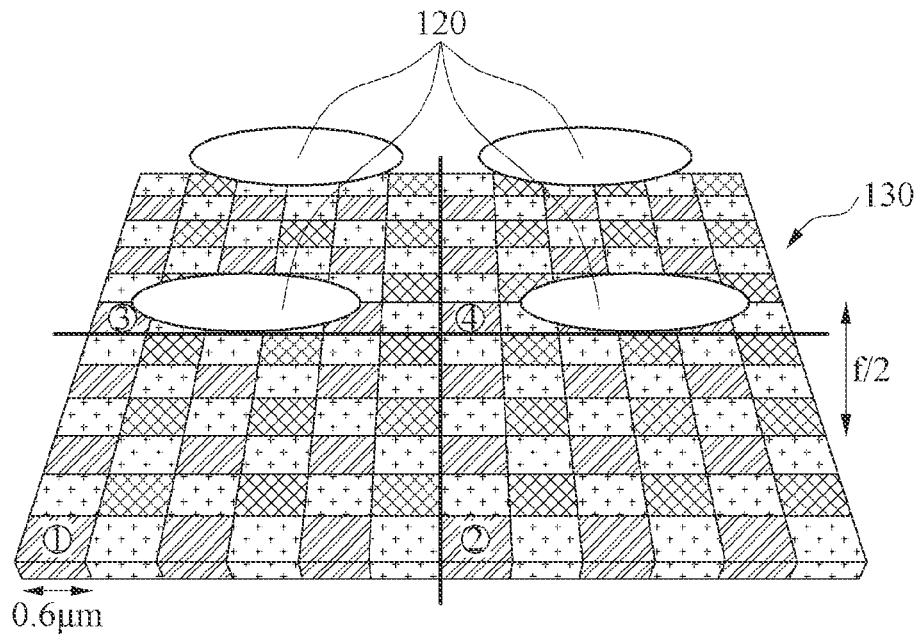

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first", "second," and the like are used to explain various members, components, regions, layers, or sections, these members, components, regions, layers, or sections are not limited to the terms. Rather, these terms should be used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of a pixel structure of an image sensor corresponding to a lens of an array lens camera, and a pixel structure of an image sensor corresponding to a lens of a general camera. Referring to FIG. 1, a pixel structure 110 of an image sensor in a general camera including a single lens 105 and a pixel structure 130 of an image sensor in an array lens camera including a plurality of lenses 120 are illustrated. In the following description, the array lens camera may be referred to as an "ALC".

The pixel structure 110 may have, for example, a Bayer pattern (e.g., a Bayer filter or Bayer filter mosaic) generated such that 2×2 pixels of the image sensor have the same color filter. To compensate for a decrease in sensitivity of a pixel caused by miniaturization of the pixel, the 2×2 pixels may have the same color filter. To increase sensitivity of a pixel, values of pixels (e.g., pixels ①, ②, ③, and ④) among the 2×2 pixels may be added or averaged. Adding or averaging values of pixels as described above may be referred to as "binning", which will be described in detail below.

The pixel structure 130 may correspond to a pixel structure of an image sensor in an array lens camera (ALC) including a plurality of lenses 120 (e.g., four lenses). In an example, an image captured by the ALC may be used. A size of the ALC may be reduced, because the plurality of lenses 120 with a small aperture, instead of a single lens 105, are used.

For example, when the aperture of the lenses 120 included in the ALC is halved in comparison to an aperture of the lens 105 of the general camera, a focal length f may be reduced to half (f/2), and accordingly a thickness of a camera may be further reduced. When a position of one subject is used as a criterion, a position in which an image of the subject is formed in the plurality of lenses 120 may vary according to the plurality of lenses 120. Therefore, when binning is performed on values of the pixels ①, ②, ③, and ④ at the same position based on each of the plurality of lenses 120 regardless of a distance to the subject, a blurred image may be generated.

In an example, binning may be performed by quickly finding four corresponding points at which the image of the subject is formed in pixels of the image sensor corresponding to each of the four lenses 120, based on a distance between the subject and each of the four lenses 120, and thus a high-resolution image may be clearly restored even with a relatively small amount of computational operation.

Figure 2:
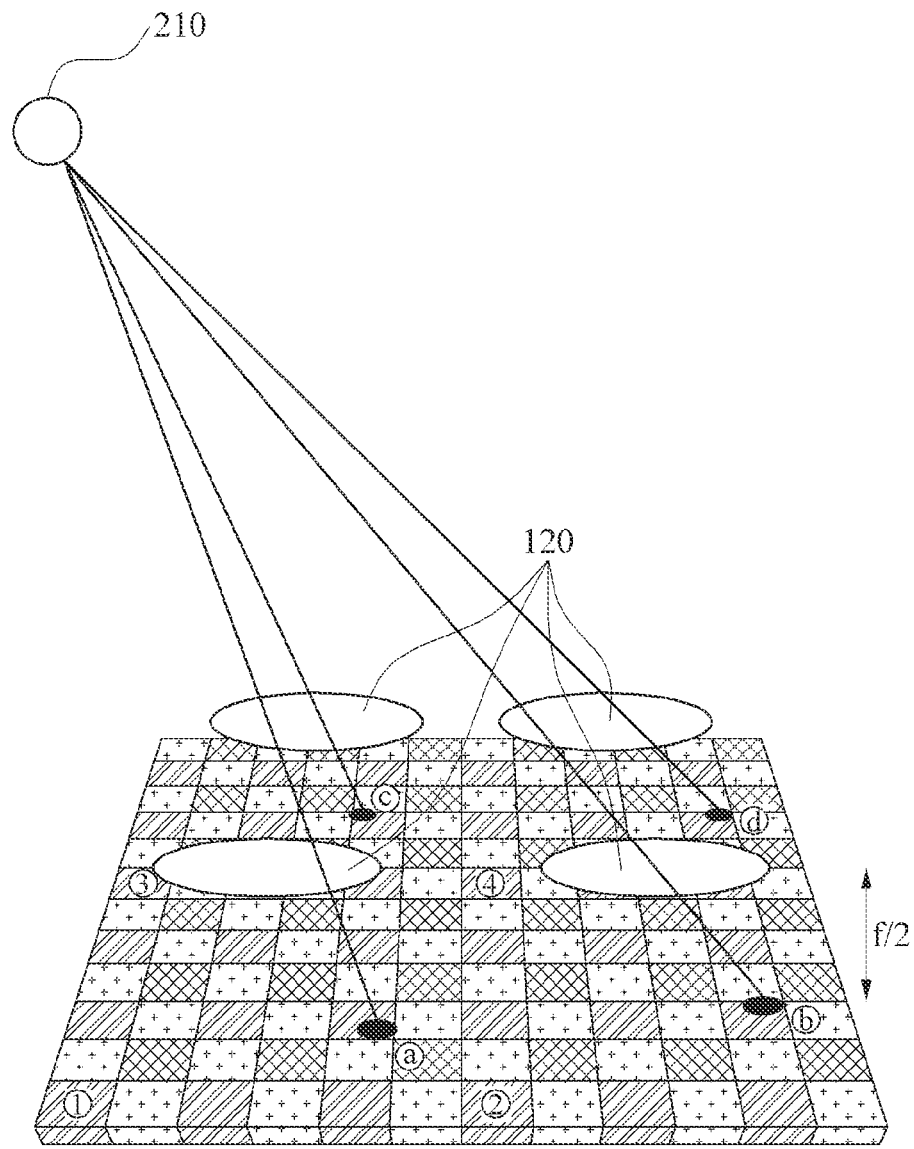
FIG. 2 illustrates an example of a corresponding point.

FIG. 2 illustrates an example of a corresponding point. Referring to FIG. 2, corresponding points ⓐ, ⓑ, ⓒ, and ⓓ of a plurality of lenses 120 (e.g., four lenses) corresponding to a position of a subject 210 are illustrated.

For example, when corresponding points are searched for regardless of a distance between the four lenses 120 and the subject 210, positions of pixels ①, ②, ③, and ④ of an image sensor arranged at the same position based on each of the lenses 120 may be determined to be corresponding points. However, a position at which an image of the subject 210 is formed in the plurality of lenses 120 may vary according to the plurality of lenses 120.

In an example, positions of the corresponding points ⓐ, ⓑ, ⓒ, and ⓓ corresponding to four positions at which the image of the subject 210 is formed in the respective lenses 120 may be found based on the distance between the lenses 120 and the subject 210. The corresponding points ⓐ, ⓑ, ⓒ, and ⓓ may be pixels of the image sensor corresponding to positions in which the same subject is detected (or captured) in each of the lenses 120. Corresponding points may also be referred to as "corresponding point pixels".

In addition, a result obtained by performing binning on values of the pixels ①, ②, ③, and ④ at the same position based on each of the lenses 120 may be different from a result obtained by performing binning on pixel values of the corresponding points ⓐ, ⓑ, ⓒ, and ⓓ.

Figure 3:
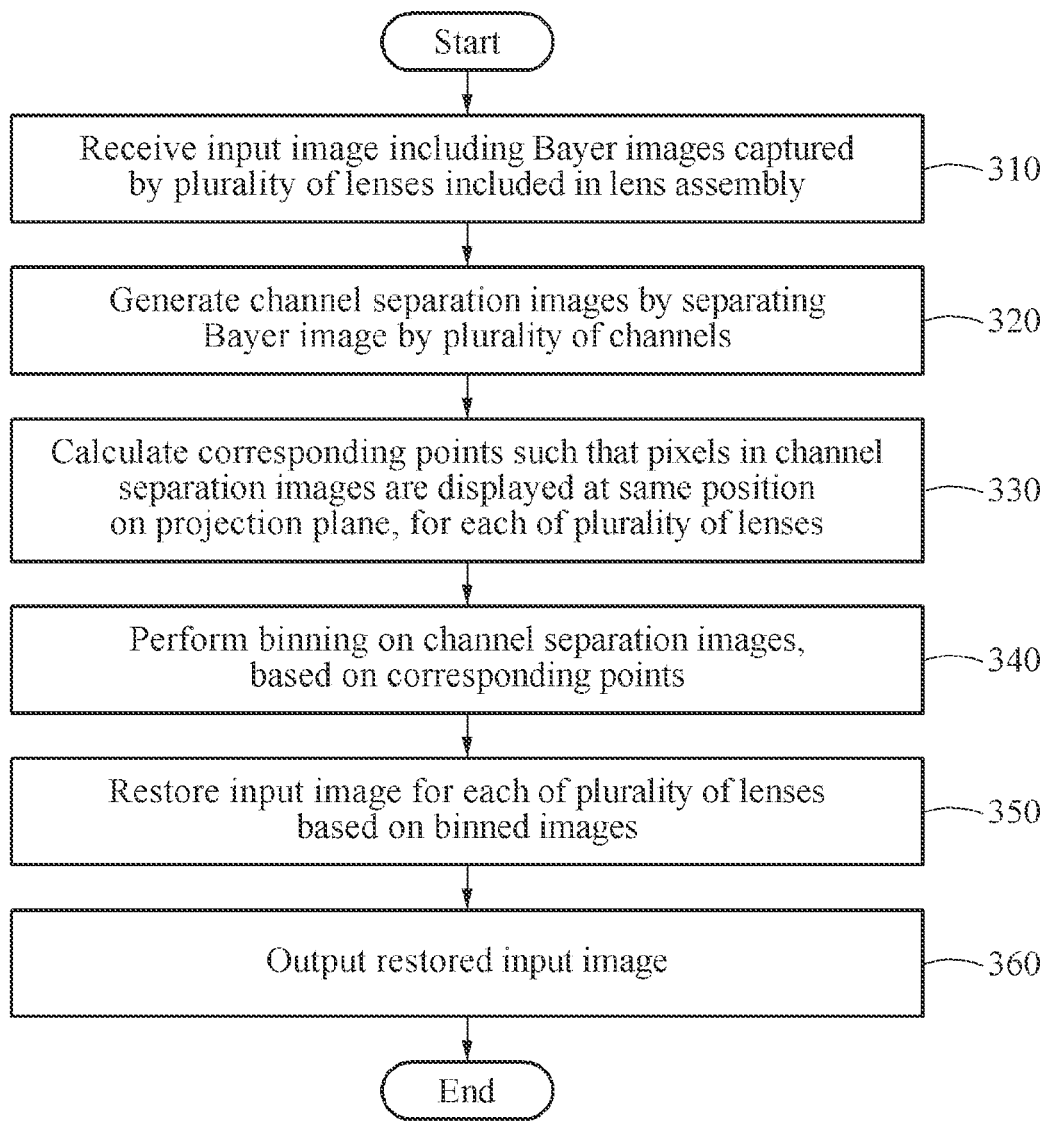
FIG. 3 is a flowchart illustrating an example of a method of processing an image.

FIG. 3 is a flowchart illustrating an example of a method of processing an image. In the following examples, operations may be performed sequentially, but not necessarily performed sequentially. For example, the order of the operations may be changed and at least two of the operations may be performed in parallel.

Referring to FIG. 3, a process in which an apparatus for processing an image (hereinafter, referred to as an "image processing apparatus") outputs a restored input image through operations 310 to 360 is illustrated.

In operation 310, the image processing apparatus may receive an input image including Bayer images captured by a plurality of lenses included in a lens assembly. The lens assembly may correspond to, for example, a lens array including a plurality of lenses of an ALC, but is not limited thereto.

The input image may be, for example, a Bayer image captured by an ALC, but is not limited thereto. As described above, since the ALC includes the plurality of lenses, the input image may appear as if images (e.g., Bayer images) captured by adjacent cameras are stitched. For example, the input image may include image information slightly different from each other for each lens according to a position of each lens. For a non-limiting example of the input image, reference may be made to an input image 410 of FIG. 4 below.

For example, in the image sensor, R, G, and B filters may be arranged in a predetermined pattern on the same number of arranged mono cells as a number of pixels. The R, G, and B filters may be optical filters that transmit red, green, and blue, respectively. In the image sensor, the R, G, and B filters may be arranged in a predetermined pattern. For example, according to human visual characteristics, an R filter, G filters and a B filter may intersect in a pattern of R, G, G, B so that the G filters may be 50% and that each of the R filter and the B filter may be 25%. A pattern in which filters of the image sensor intersect may be referred to as a "Bayer pattern". Bayer images may be construed as images expressed in a Bayer pattern.

In operation 320, the image processing apparatus may generate channel separation images Rn, Gn, Gn, and Bn by separating each of the Bayer images by a plurality of channels. Here, "n" may correspond to a camera or lens number and may be 0, 1, or 2. The image processing apparatus may arrange each of the Bayer images in corresponding pixels for each of the plurality of channels included in the Bayer pattern, to separate the plurality of channels.

A non-limiting example in which the image processing apparatus generates the channel separation images Rn, Gn, Gn, and Bn by separating each of the Bayer images by a plurality of channels will be further described below with reference to FIG. 4.

In operation 330, the image processing apparatus may calculate corresponding points such that pixels in the channel separation images Rn, Gn, Gn, and Bn are displayed at the same position on a projection plane, for each of the plurality of lenses. For example, the image processing apparatus may calculate corresponding points such that a subject is displayed at the same position on the projection plane for each of the lenses, based on an assumption that all objects are on the same plane (e.g., a projection plane). In other words, the image processing apparatus may calculate a corresponding point corresponding to a point (e.g., a pixel) at which the same subject is detected (or captured) for each of the lenses.

For example, the image processing apparatus may calculate corresponding points of pixels of the channel separation images Rn, Gn, Gn, and Bn, based on an optical flow in the channel separation images Rn, Gn, Gn, and Bn.

In another example, the image processing apparatus may calculate the corresponding points of the pixels of the channel separation images Rn, Gn, Gn, and Bn for each of the plurality of lenses, based on calibration information and depth information for each of the plurality of lenses. In this example, the depth information may correspond to information on a distance between a subject and an ALC including a plurality of lenses. In addition, the depth information may correspond to, for example, a distance between a subject and lens #0 corresponding to a representative lens of an ALC including four lenses. In the following description, depth information and distance information may be construed to have the same meaning.

In another example, the image processing apparatus may store information about the corresponding points in a lookup table (LUT) and may calculate the corresponding points by calling the LUT. For example, the image processing apparatus may call a LUT that stores corresponding points of some pixels at a predetermined distance (e.g., a short distance and a long distance) among the pixels in the channel separation images Rn, Gn, Gn, and Bn, for each lens. The image processing apparatus may calculate the corresponding points of the pixels in the channel separation images Rn, Gn, Gn, and Bn by interpolating the corresponding points of some pixels at the predetermined distance stored in the LUT based on a reciprocal number of depth information.

In an example, compared to a typical image processing apparatus, the image processing apparatus of one or more embodiments may reduce an amount of computational operation by storing corresponding points according to a distance calculated through calibration in a LUT and by calculating corresponding points based on depth information with a subject. A non-limiting example in which the image processing apparatus calculates corresponding points will be described in more detail with reference to FIGS. 6 to 7B below.

In operation 340, the image processing apparatus may perform binning on the channel separation images Rn, Gn, Gn, and Bn, based on a brightness difference and a distance difference between a target corresponding point and a center of a pixel including the target corresponding point, corresponding to each of the corresponding points calculated in operation 330 in channel separation images that correspond to the same channel and that are combined into one image, for each of the plurality of lenses. The image processing apparatus may perform binning by separating corresponding points by channels.

The binning may also be referred to as "pixel binning" in that a plurality of pixels of an image sensor are grouped into one pixel and used. Pixel binning may be performed to allow the image sensor to be more suitable for various conditions (e.g., to increase an accuracy of image processing of the image sensor for various conditions), thereby generating a substantially small number of high-quality pixels by combining data of a group of pixels in the image sensor. Through the binning, the image processing apparatus may allow a plurality of pixels with the same size to be included, while maintaining a quality of an image without a change. The image processing apparatus may form and use a group of four pixels, to increase an amount of light received despite a decrease in a resolution.

The image processing apparatus may perform binning on the channel separation images Rn, Gn, Gn, and Bn, based on a probability value (e.g., an average) according to characteristics of corresponding points in the channel separation images Rn, Gn, Gn, and Bn that correspond to the same channel and that are combined into one image, for each of the lenses. The characteristics of the corresponding points may include, for example, the distance difference and the brightness difference between the center of the pixel and the target corresponding point which are described above. In addition, the characteristic of the corresponding points may further include a gradient difference in addition to the distance difference and the brightness difference.

The image processing apparatus may determine a weight based on the distance difference and the brightness difference, or based on a gradient difference between the center of the pixel and the target corresponding point, the distance difference and the brightness difference, corresponding to each of the corresponding points in the channel separation images Rn, Gn, Gn, and Bn combined into one image during the binning, for each of the lenses. The image processing apparatus may calculate a weighted average of the corresponding points for each of the lenses, based on the weight. The image processing apparatus may perform binning on the channel separation images Rn, Gn, Gn, and Bn by applying different weights to positions of the channel separation images Rn, Gn, Gn, and Bn, to generate binned images R, G, G, and B. The pixel binning may also be called "filtering" in that various filtering schemes are used. An example of performing binning in the image processing apparatus will be further described below with reference to FIGS. 8 and 9.

In operation 350, the image processing apparatus may restore the input image for each of the plurality of lenses based on the binned images R, G, G, and B generated in operation 340. The binned images R, G, G, and B may be obtained by combining images corresponding to the same channel among the channel separation images Rn, Gn, Gn, and Bn. The image processing apparatus may generate a second Bayer image by combining the binned images R, G, G, and B, corresponding to the plurality of lenses. The image processing apparatus may restore the input image to a color image by interpolating colors for each of pixels of the second Bayer image. The image processing apparatus may generate the second Bayer image by combining the binned images so that each of the channels of the binned images has a Bayer pattern.

In the above process, the image sensor may detect only one color among R, G, and B in each pixel, but a camera image may represent all colors of R, G, and B for each pixel. This is because colors are formed by interpolating color values of neighboring cells for each pixel in software in the camera image. Interpolating colors for each pixel from Bayer pattern data may be called "demosaicing", which may correspond to a process of restoring an input image to a color image by interpolating colors for each of the pixels of the second Bayer image in operation 350.

The image processing apparatus may use various interpolation schemes, such as bilinear interpolation and trilinear interpolation, to interpolate colors for each of the pixels of the second Bayer image, however, the examples are not limited thereto. An example of restoring the input image in the image processing apparatus will be further described below with reference to FIG. 10.

According to an example, the image processing apparatus may restore a resolution by up-sampling the binned images R, G, G, and B for each of the plurality of lenses. For example, the image processing apparatus may generate a second Bayer image by combining images R', G', G', and B' with the restored resolution. The image processing apparatus may restore the input image by converting each of the pixels of the second Bayer image to represent a plurality of pieces of color information.

Since binning is performed by forming and using a group of a plurality of pixels, the plurality of pixels may have a resolution corresponding to one lens when binning is performed. For example, when binning is performed on pixels when four lenses are used, the resolution of the restored image may be reduced to ¼ of the overall resolution of the image sensor. For example, a resolution of the input image reduced in a binning process may be restored through a super-resolution scheme that is an image processing technology of doubling a resolution of a restored image horizontally and vertically.

In operation 360, the image processing apparatus may output the input image restored in operation 350. The image processing apparatus may output the restored input image through a display (e.g., a display 1650 of FIG. 16) or may output the restored image through a communication interface (e.g., a communication interface 1610 of FIG. 16) to the outside of the image processing apparatus.

Figure 4:
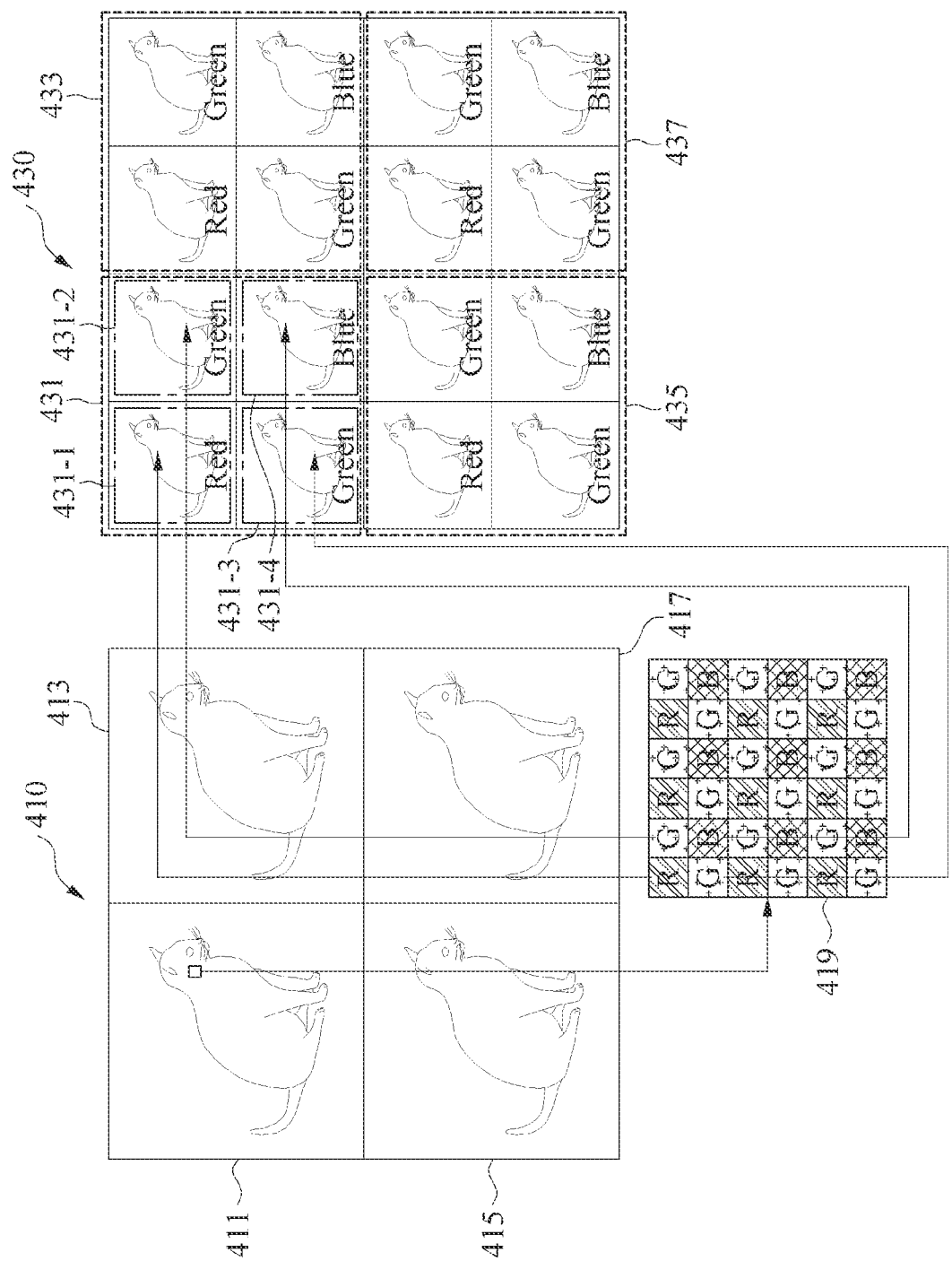
FIG. 4 illustrates an example of generating channel separation images.

FIG. 4 illustrates an example of generating channel separation images. Referring to FIG. 4, an input image 410 including Bayer images 411, 413, 415, and 417 captured by a plurality of lenses, and channel separation images 430 generated by separating the Bayer image 411 by a plurality of channels are shown.

Since an ALC includes multiple lenses in front of an image sensor, an output image of the ALC may appear as if images captured by multiple cameras are stitched. For example, when the input image 410 corresponds to an output image of the ALC, the input image 410 may include the Bayer images 411, 413, 415, and 417 captured by the plurality of lenses. The Bayer images 411, 413, 415, and 417 may correspond to, for example, an angle of view of each of four lenses. The input image 410 may include, for example, a Bayer pattern, for example, R, G, G, B.

For example, an image processing apparatus may set regions 431, 433, 435, and 437 of the image sensor corresponding to each of the plurality of lenses as shown in the channel separation images 430, and may separate channels by arranging a Bayer pattern 419 of the Bayer images 411, 413, 415, and 417 in pixels of corresponding regions 431, 433, 435, and 437 for each of R, G and B channels. For example, the image processing apparatus may separate the Bayer pattern 419 of the Bayer image 411 by a plurality of channels (e.g., R, G, and B channels) and may place the Bayer pattern 419 in pixels of the region 431 of the image sensor, to generate channel separation images 431-1, 431-2, 431-3, and 431-4 corresponding to the region 431. For example, the channel separation images 431-1, 431-2, 431-3, and 431-4 may respectively correspond to R, G, G, and B of the Bayer pattern 419.

Figure 5:
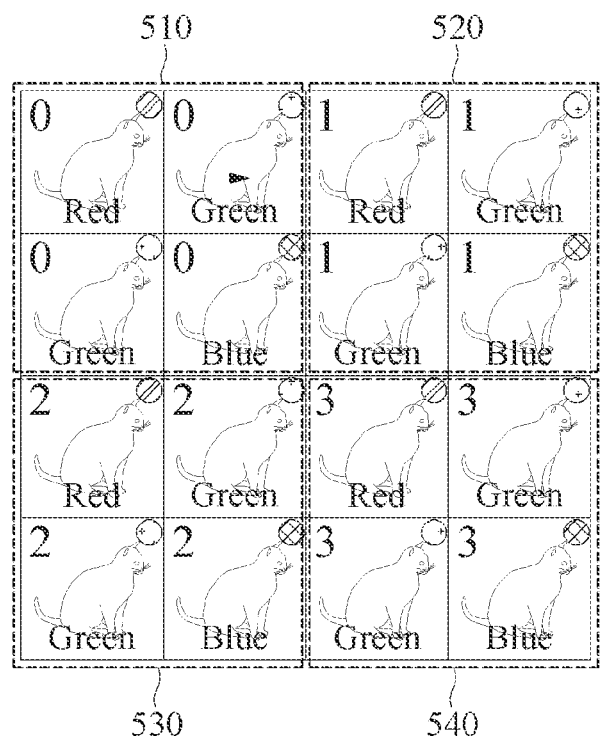
FIG. 5 illustrates camera numbers corresponding to channel separation images.

FIG. 5 illustrates a camera or lens number corresponding to channel separation images. FIG. 5 illustrates numbers of four lenses (e.g., #0, #1, #2, and #3) of a camera respectively corresponding to regions 510, 520, 530, and 540 of an image sensor corresponding to each of the four lenses.

In an example, the four lenses may be disposed above the image sensor, to collect light emitted from a subject and transmit the light to pixels of the image sensor.

An upper left region 510 of the image sensor may correspond to lens #0, an upper right region 520 of the image sensor may correspond to lens #1, a lower left region 530 of the image sensor may correspond to lens #2, and a lower right region 540 of the image sensor may correspond to lens #3.

Hereinafter, although there is no separate description, it may be understood that the above-described correspondence relationship remains the same.

Figure 6:
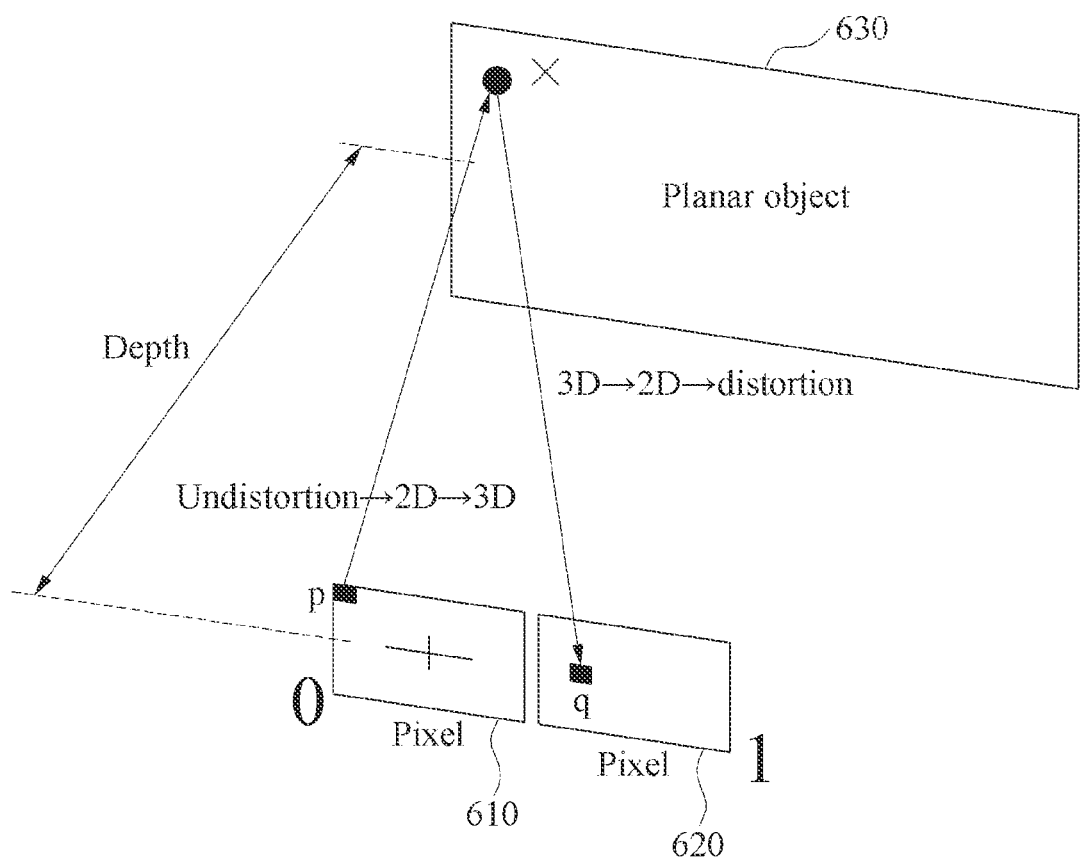
FIG. 6 illustrates an example of calculating corresponding points.

FIG. 6 illustrates an example of calculating corresponding points. FIG. 6 illustrates a pixel p on an image plane 610 of an image sensor corresponding to lens #0, a pixel q on an image plane 620 of the image sensor corresponding to lens #1, and a position X on a projection plane 630 in a three-dimensional (3D) space in which a subject is located.

For example, a subject may be at the position X on the projection plane 630 at a predetermined distance from a camera. An image processing apparatus may calculate a corresponding point pixel corresponding to each of the lenses #0 and #1. The image processing apparatus may map the position X of the subject at the predetermined distance and the camera to the pixel p corresponding to the lens #0 and the pixel q corresponding to the lens #1, using calibration parameters.

The image processing apparatus may calculate corresponding points based on acquired depth information about a distance between the camera and the subject and calibration information of the camera, examples of which will be described below. Here, it may be assumed that all objects are present at the distance between the camera and the subject, that is, all objects are on the same plane.

For example, it may be assumed that a corresponding point in the lens #1 is calculated based on the lens #0 in an R channel shown in FIG. 5.

The image processing apparatus may use a lens distortion parameter and an intrinsic parameter of the lens #0 to convert a position of the pixel p on the image plane 610 of the image sensor corresponding to the lens #0 into coordinates of a two-dimensional (2D) normalized image plane. The image processing apparatus may determine that the pixel p on the image plane 610 is captured from the position X on the plane 630 in the 3D space, based on the acquired depth information between the camera and the subject.

The image processing apparatus may know (e.g., determine) a pixel of the image plane 620 to which the position X is mapped, by projecting the position X on the projection plane 630 to the image plane 620 corresponding to the lens #1, using the calibration information of the camera.

For example, the image processing device may convert the position X in 3D into coordinates of the 2D normalized image plane using an external parameter of the lens #1 based on the lens #0. In addition, the image processing apparatus may calculate coordinates of the pixel q on the image plane 620 corresponding to the lens #1, using a lens distortion parameter and an intrinsic parameter of the lens #1. Here, the pixels p and q may correspond to corresponding points.

The above-described process may equally be applied to lenses #2 and #3.

Figure 7A:
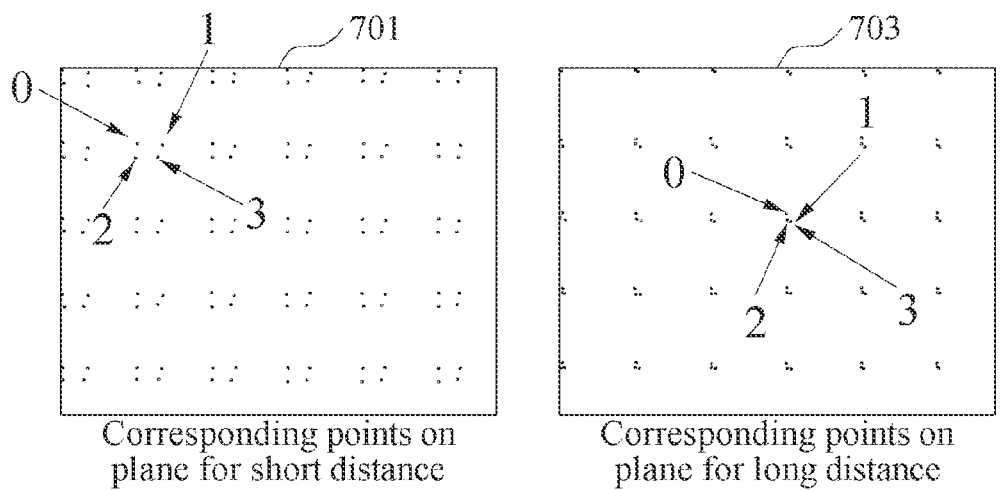
FIGS. 7A and 7B illustrate examples of storing corresponding points in a lookup table (LUT).
Figure 7B:
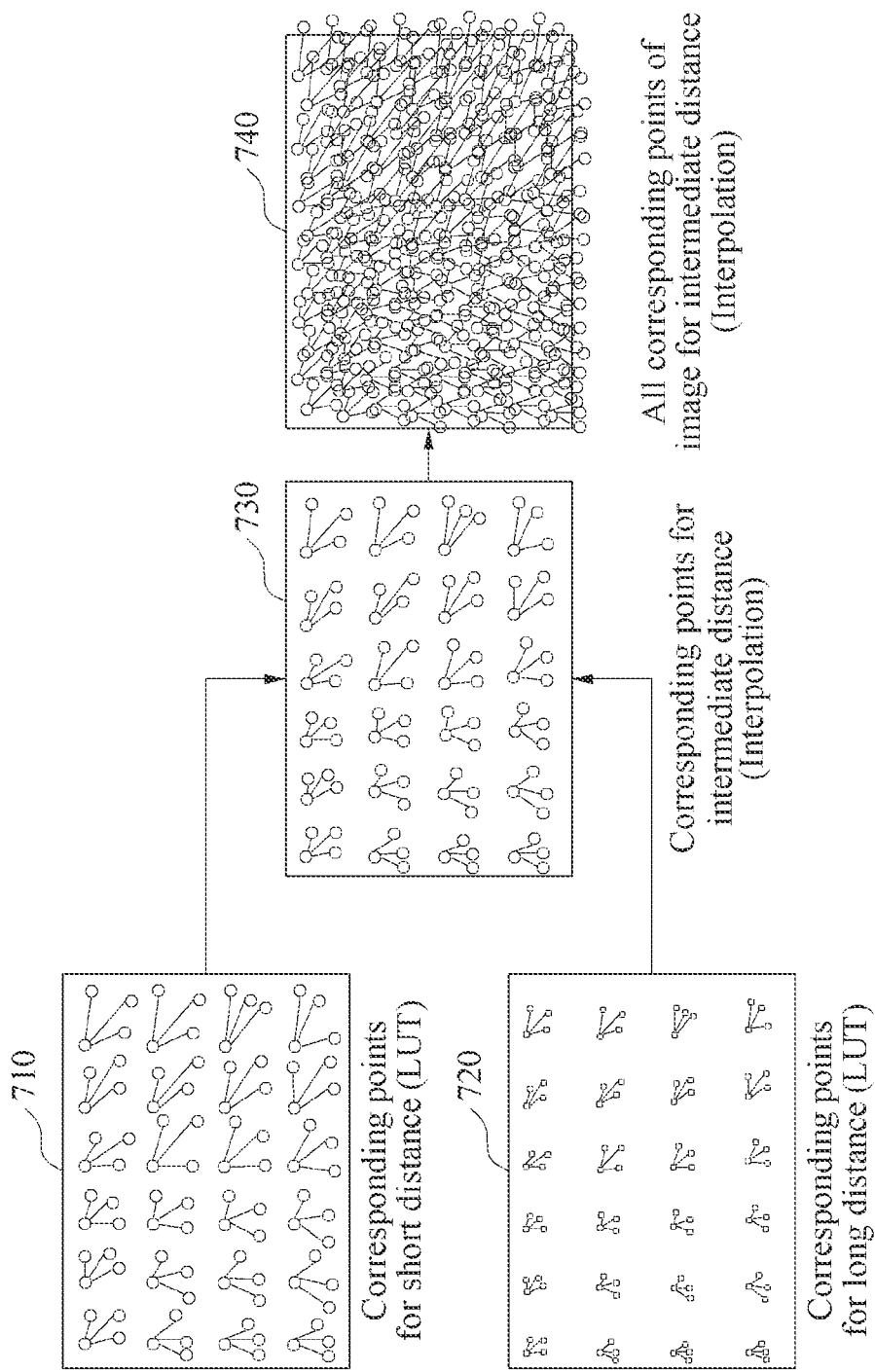

FIGS. 7A and 7B illustrate examples of storing corresponding points in a LUT.

FIG. 7A illustrates corresponding points of each of lenses according to a distance between a camera and a subject. In FIG. 7A, corresponding points on an image plane in an example in which the distance between the camera and the subject is short based on lens #0 are shown as indicated by reference numeral 701, and corresponding points on an image plane in an example in which the distance between the camera and the subject is long based on the lens #0 are shown as indicated by reference numeral 703. A difference between corresponding points according to the distance between the camera and the subject may be called "disparity".

When a typical image processing apparatus calculates corresponding points of all pixels using the method described above with reference to FIG. 6, a large amount of computational operation may be required. Accordingly, the image processing apparatus of one or more embodiments may use the corresponding points that are stored in advance in the LUT (e.g., where the corresponding points are stored in advance by the image processing apparatus).

FIG. 7B illustrates a scheme of storing corresponding points according to a distance between a camera and a subject in a LUT and using the corresponding points.

As described above, all corresponding points of lenses #1, #2, and #3 may be calculated based on all pixels on an image plane of an image sensor corresponding to lens #0. However, an amount of computational operation may increase through such calculation.

Accordingly, corresponding points of each of the lenses #1, #2, and #3 corresponding to some pixels on the image plane of the image sensor corresponding to the lens #0 may be calculated in advance and stored in the LUT (e.g., by the image processing apparatus of one or more embodiments). In this example, the image processing apparatus of one or more embodiments may store corresponding points of some pixels in the LUT, instead of storing corresponding points of all pixels of the image plane. For example, the image processing apparatus may calculate corresponding points for a short distance as indicated by reference numeral 710, may calculate corresponding points for a long distance as indicated by reference numeral 720, and may store the corresponding points in the LUT.

Subsequently, the image processing apparatus may calculate a depth between the camera and the subject by performing an auto-focusing (AF) function. For example, the calculated depth may correspond to an intermediate distance that is greater than the short distance and less than the long distance. In this example, the image processing apparatus may calculate corresponding points for the intermediate distance as indicated by reference numeral 730, by interpolating corresponding points of each pixel stored in the LUT corresponding to each of the short distance and the long distance. For example, the image processing apparatus may calculate corresponding points of all pixels on the image plane for the intermediate distance as indicated by reference numeral 740, by interpolating the corresponding points for the intermediate distance as indicated by reference numeral 730 based on a reciprocal number of depth information.

Figure 8:
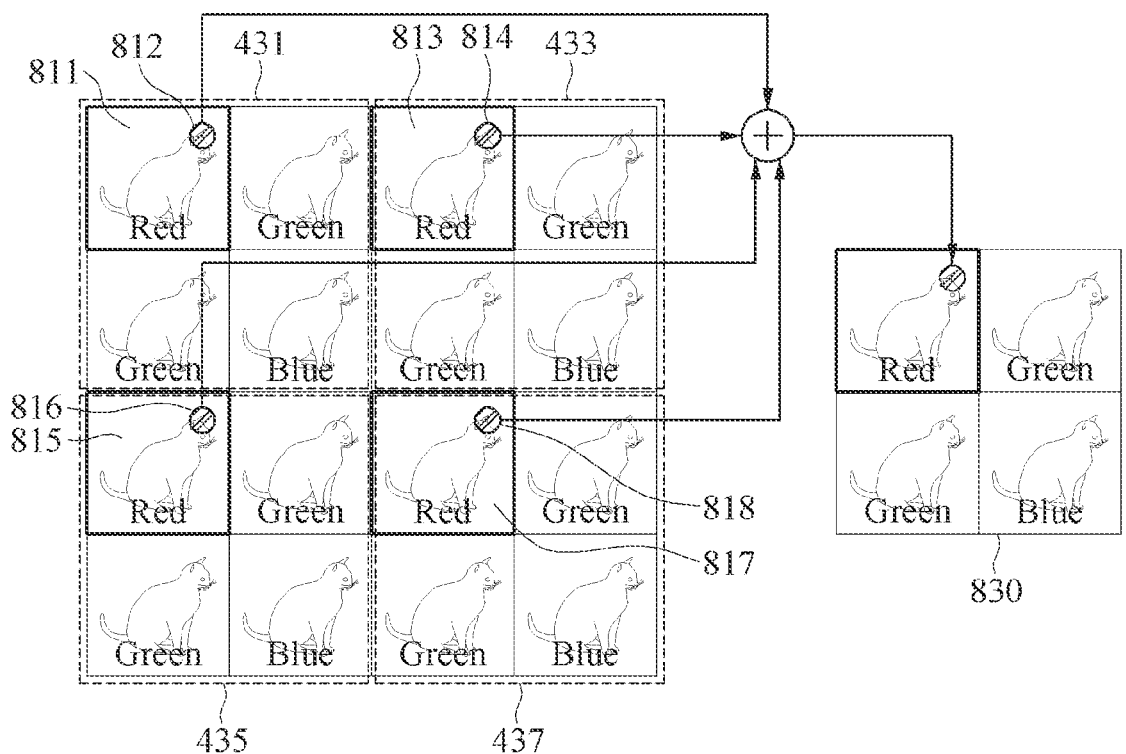
FIG. 8 illustrates an example of performing binning.

FIG. 8 illustrates an example of performing binning. FIG. 8 illustrates corresponding points 812, 814, 816, and 818 in channel separation images 811, 813, 815, and 817 corresponding to an R channel respectively among regions 431, 433, 435, and 437 of an image sensor, and images 830 binned using pixels corresponding to positions of the corresponding points 812, 814, 816, and 818.

An image processing apparatus may perform binning (filtering) for each channel using pixels corresponding to the positions of the corresponding points 812, 814, 816, and 818 in the same channels on the top, bottom, left, and right in each of channel separation images corresponding to a corresponding channel. The corresponding points 812, 814, 816, and 818 may be calculated, for example, through a process of FIGS. 9A to 10 that will be described below, however, the examples are not limited thereto.

In an example of the R channel, the image processing apparatus may perform binning (filtering) using pixel values of the corresponding points 812, 814, 816, and 818 in the channel separation images 811, 813, 815, and 817 corresponding to the R channel. For example, unlike a typical image processing apparatus which may simply add or average the pixel values of the corresponding points 812, 814, 816, and 818, the image processing apparatus of one or more embodiments may recognize characteristics of the corresponding points 812, 814, 816, and 818, may assign weights for each of the corresponding points and may add or average the corresponding points to perform binning so that the binned images 830 may have a higher quality than binned images generated by the typical image processing apparatus.

For convenience of description, a result obtained by performing binning on corresponding points in the channel separation images 811, 813, 815, and 817 corresponding to the R channel among the regions 431, 433, 435, and 437 of the image sensor is described with reference to FIG. 8, but such binning may be performed on corresponding points in channel separation images corresponding to a first G channel, a second G channel and a B channel in the same manner as described above.

Figure 9A:
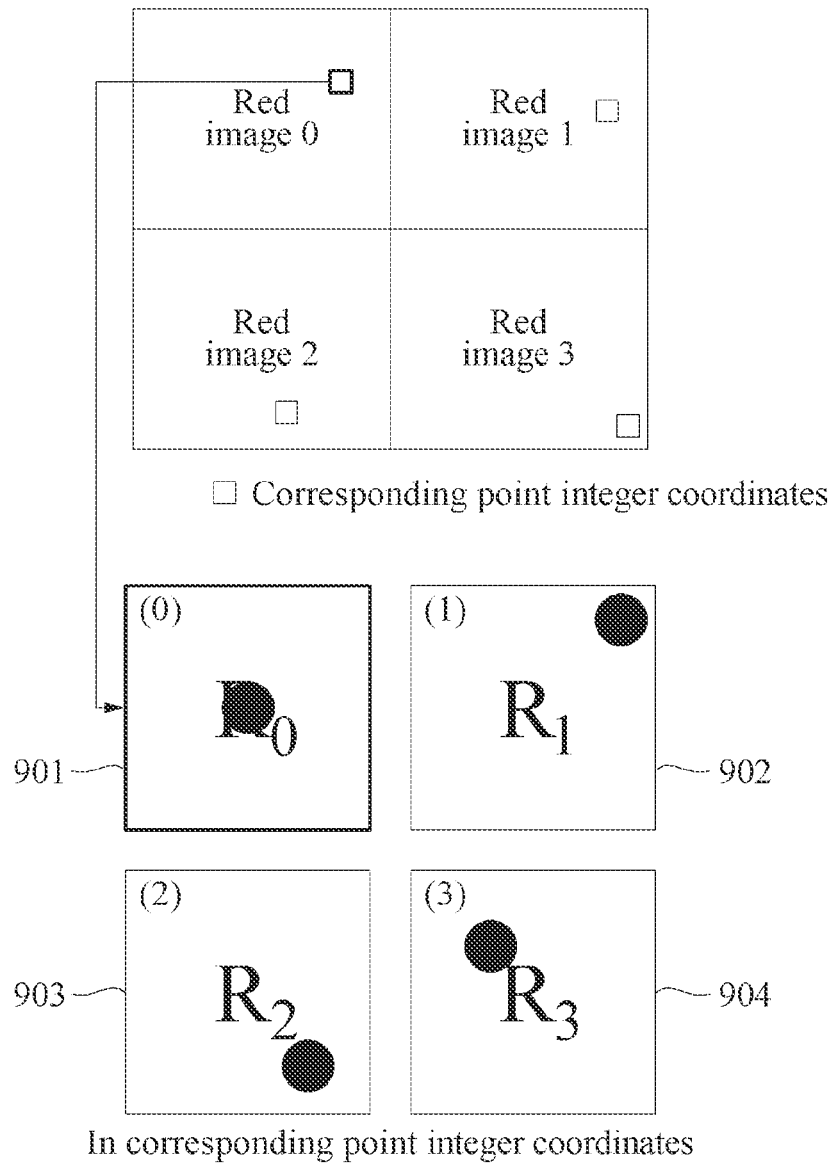
FIGS. 9A and 9B illustrate examples of performing binning using weighted average filtering.
Figure 9B:
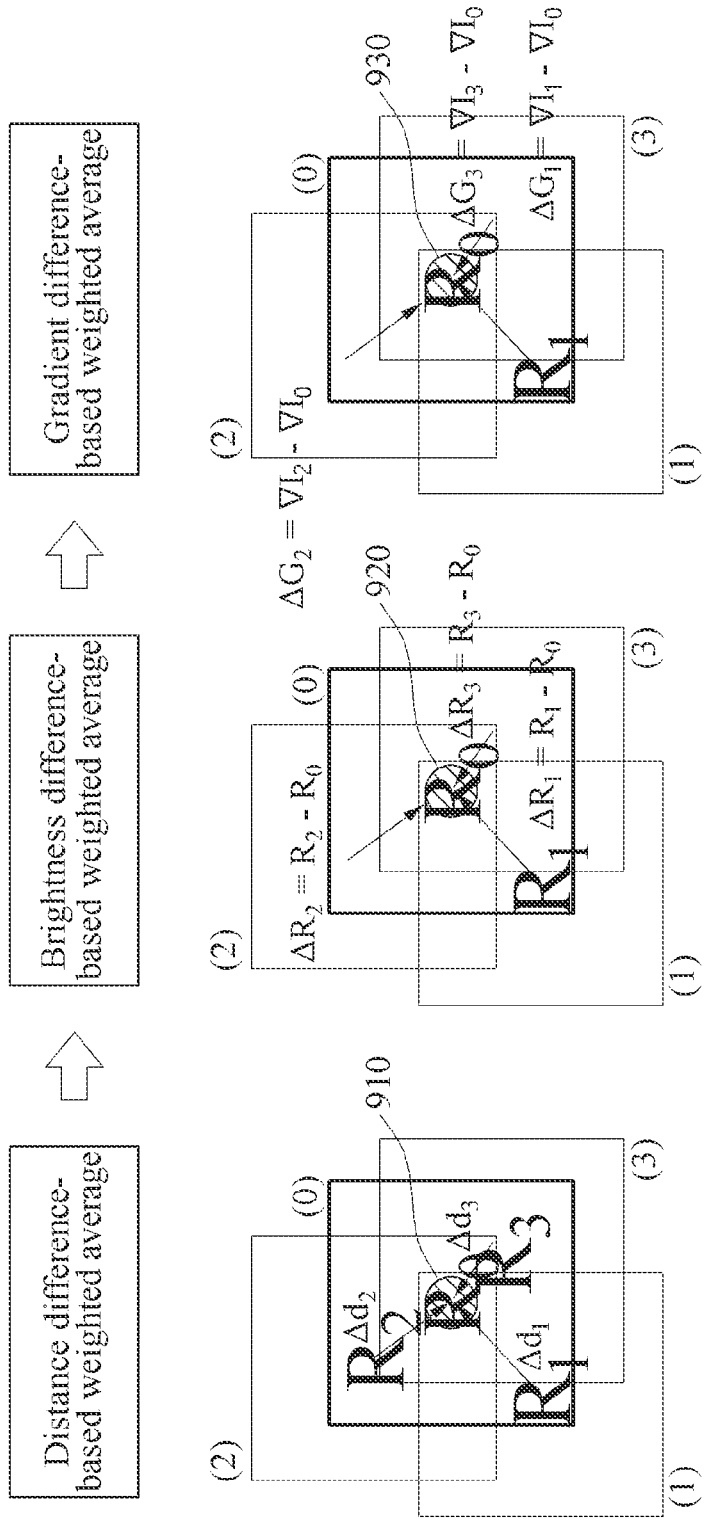

FIGS. 9A and 9B illustrate examples of performing binning using weighted average filtering. FIG. 9A illustrates a matching relationship between channel separation images of an R channel corresponding to each of lenses of a camera and corresponding points appearing on the channel separation images.

When a subject is displayed on an image plane of a channel separation image at a predetermined distance from each of the lenses of the camera, a distance to a focal point on the image plane may be accurately calculated. However, it may be difficult to know a distance to one of points other than the focal point on the image plane of the channel separation image. When the distance to the focal point on the image plane of the channel separation image is not accurate, an error of corresponding points may occur, which may result in a decrease in an image quality during binning.

Accordingly, the image processing apparatus of one or more embodiments may determine characteristics (e.g., a distance, a brightness, a gradient, etc.) of corresponding points 902, 903, and 904 on an image plane corresponding to lenses #1, #2, and #3 combined based on a corresponding point 901 of a channel separation image corresponding to lens #0. Subsequently, weighted averaging may be performed, and binning may be performed. The image processing apparatus may transform an exponential function used to calculate a weight to a linear expression, and/or may store a transformation result of the exponential function in a LUT and use the transformation result.

FIG. 9B illustrates an example of a process of performing binning using weighted average filtering.

When corresponding points are calculated for each of pixels corresponding to each lens, that is, for each of channel separation images, an image processing apparatus may perform binning using various filtering schemes that will be described below.

Overlapping four boxes of FIG. 9B may indicate that corresponding points (circular points) displayed on each of pixels are matched. The four boxes of FIG. 9B may respectively correspond to pixels 0, 1, 2, and 3. This is because corresponding point pixels of cameras #1, #2, and #3 have real number coordinates, not integer coordinates, based on camera #0. Accordingly, binning may be performed using a weighted average of pixel values of four pixels.

In an example, the image processing apparatus may calculate a weight $w_i$ based on a brightness difference and a distance difference between a center of a pixel including a target corresponding point and the target corresponding point, corresponding to each of corresponding points in channel separation images, and may calculate a weighted average R' of the corresponding points for each of a plurality of lenses. In another example, the image processing apparatus may calculate a weight $w_i$ based on a gradient difference, a brightness difference, and a distance difference between a center of a pixel including a target corresponding point and the target corresponding point, corresponding to each of corresponding points in channel separation images, and may calculate a weighted average R' of the corresponding points for each of the plurality of lenses.

For example, the image processing apparatus may calculate a weighted average of four pixel values using, as a weight, a distance from the center of the pixel including the target corresponding point to corresponding points.

In an example, when a center 910 of a pixel (0) corresponding to lens #0 is close to corresponding points 901, 902, 903, and 904 in pixels (0), (1), (2), and (3) corresponding to lenses #0, #1, #2, and #3, the image processing apparatus may determine a high weight $w_i$. When the center 910 is far from the corresponding points 901, 902, 903, and 904, the image processing apparatus may determine a low weight $w_i$ and calculate a weighted average R' of corresponding points for each of the plurality of lenses. Such a scheme of performing binning by applying a distance difference between the corresponding points 901, 902, 903, and 904 as a weight may be called "Gaussian filtering" and may be expressed as shown in Equation 1 below, for example.

$$w_i = \exp\left(-\frac{\Delta d_i^2}{2\sigma_d^2}\right) R' = \frac{\sum_{i=0}^{3} R_i w_i}{\sum_{i=0}^{3} w_i} \quad \text{Equation 1}$$

In Equation 1, $\Delta d_i$ denotes a distance difference between the center 910 of the pixel $\sigma_d$ corresponding to the lens #0 and the corresponding points 901, 902, 903, and 904, and may correspond to a Gaussian width for the distance difference. Also, $R_i$ may correspond to pixel values of the corresponding points 901, 902, 903, and 904. $\Sigma_{i=0}^{3} w_i$ may be a normalized weight $w_i$ corresponding to each of the corresponding points 901, 902, 903, and 904.

The weight $w_i$ may be determined to decrease as the distance difference $\Delta d_i$ increases, and may be determined to increase as the distance difference $\Delta d_i$ decreases.

When each corresponding point is close to a center of a pixel, that is, when the distance difference $\Delta d_i$ is small, the image processing apparatus may determine a large weight. When each corresponding point is far from the center of the pixel, that is, when the distance difference $\Delta d_i$ is large, the image processing apparatus may calculate an average value of the distance difference by reducing the weight.

Since blur may occur in a binned image when a distance difference between corresponding points is simply applied as a weight in the binning process, the image processing apparatus may apply the weight using the distance difference and the brightness difference between the corresponding points together.

The image processing apparatus may determine a weight using a brightness difference between the corresponding points 901, 902, 903, and 904 in the pixels (0), (1), (2), and (3) corresponding to the lenses #0, #1, #2, and #3 based on a center 920 of the pixel (0) corresponding to the lens #0 together with the above-described distance difference. The image processing apparatus of one or more embodiments may reduce noise of an image by a weight based on the brightness difference and the distance difference between the center 920 of the pixel including a target corresponding point and the target corresponding point, so that the image may be clearly represented.

Such a scheme of performing binning by applying the distance difference and the brightness difference together as weights may be called "bilateral filtering". Bilateral filtering may be expressed as shown Equation 2 below, for example.

$$w_i = \exp\left(-\frac{\Delta d_i^3}{2\sigma_d^2}\right)\exp\left(-\frac{\Delta R_i^3}{2\sigma_r^2}\right) \quad \text{Equation 2}$$

$$R' = \frac{\sum_{i=0}^{3} R_i w_i}{\sum_{i=0}^{3} w_i}$$

In Equation 2, $\Delta R_i$ denotes a difference between a brightness value of the center 910 of the pixel corresponding to the lens #0 and a brightness value of each of the corresponding points 901, 902, 903, and 904, and $\sigma_r$ may correspond to a Gaussian width for the brightness difference.

The weight may be determined to decrease as the brightness difference $\Delta R_i$ increases, and may be determined to increase as the brightness difference $\Delta R_i$ decreases. An exponential function used for filtering in Equation 2 may be transformed to a LUT or a linear expression. The image processing apparatus may perform bilateral filtering on all regions of the image sensor regardless of a focal point.

In addition, the image processing apparatus may determine a weight, using a gradient difference between images in addition to the above-described distance difference and brightness difference.

Such a scheme of performing binning using a gradient difference in addition to a distance difference and brightness difference between a center of a pixel including a target corresponding point and the target corresponding point may be called "trilateral filtering". The trilateral filtering may be expressed as shown in Equation 3 below, for example.

$$w_i = \exp\left(-\frac{\Delta d_i^3}{2\sigma_d^2}\right)\exp\left(-\frac{\Delta R_i^3}{2\sigma_r^2}\right)\exp\left(-\frac{\Delta G_i^3}{2\sigma_g^2}\right) \quad \text{Equation 3}$$

$$R' = \frac{\sum_{i=0}^{3} R_i w_i}{\sum_{i=0}^{3} w_i}$$

In Equation 3, $\Delta G_i$ denotes a difference between a gradient value of a center 930 of a pixel corresponding to lens #0 and a gradient value of each of the corresponding points 901, 902, 903, and 904, and $\sigma_g$ may correspond to a Gaussian width for the gradient difference.

For example, the image processing apparatus may increase a weight in an example of a small gradient difference between the center 930 of the pixel (0) corresponding to the lens #0 and the corresponding points 901, 902, 903, and 904 in the pixels (0), (1), (2), and (3) corresponding to the lenses #0, #1, #2, and #3, and may reduce the weight in an example of a great gradient difference, to obtain an average. As in Equation 2, an exponential function in Equation 3 may be transformed to a LUT or a linear function and used.

When an out-of-focus subject is located at a different location, the image processing apparatus of one or more embodiments may eliminate artifacts, that is, an afterimage due to a correspondence point mismatch, using the trilateral filtering.

The image processing apparatus may selectively apply a bilateral filtering scheme and a trilateral filtering scheme according to a position where a focal point is formed, to increase an image quality. For example, the image processing apparatus may apply the bilateral filtering scheme to a location when a distance from the location to the focal point is accurate, and may apply the trilateral filtering scheme to a location when a distance from the location to the focal point is inaccurate because the location is out of focus.

The image processing apparatus may distinguish between an in-focus portion and an out-of-focus portion of a camera image, using, for example, a region of interest (ROI) of a focus region when performing an AF function such that the camera may automatically focus on a subject of the camera image. The image processing apparatus may apply the bilateral filtering scheme to the in-focus portion of the camera image and may apply the trilateral filtering scheme to the out-of-focus portion.

In an example, binning may be performed through various filtering schemes based on characteristics of corresponding points, to provide a clear image processed adaptively to a capturing environment.

Figure 10:
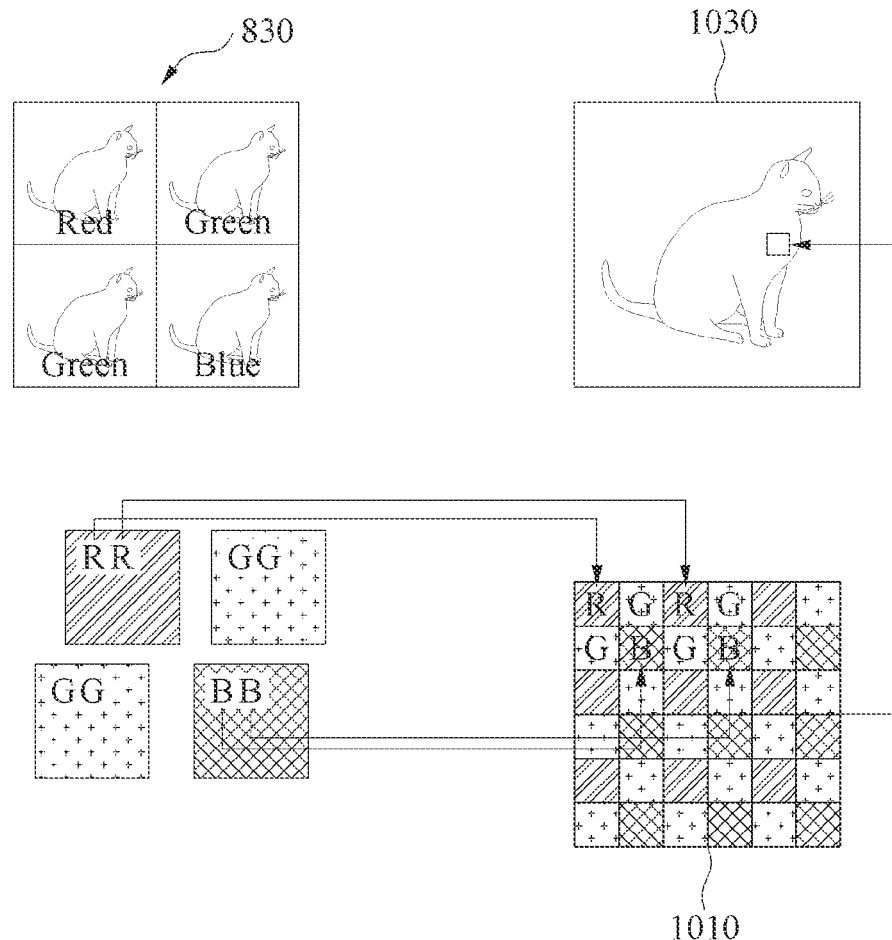
FIG. 10 illustrates an example of restoring an input image.

FIG. 10 illustrates an example of restoring an input image. Referring to FIG. 10, the binned images 830 of FIG. 8, and a second Bayer image 1030 generated by combining the binned images 830 are illustrated.

An image processing apparatus may generate a second Bayer image by combining images binned for each channel, corresponding to a plurality of lenses. For example, when binning is completed for each channel similarly to the binned images 830 for one lens, the image processing apparatus may combine channels of the binned images 830 by a Bayer pattern 1010, to generate the second Bayer image 1030. The image processing apparatus may arrange and combine the binned images 830 in an order of R, G, G, and B channels so that each of the R, G, G, and B channels of the binned images 830 may have the Bayer pattern 1010, to generate the second Bayer image 1030.

The image processing apparatus may combine the channels of the binned images 830 through the above-described process, to generate the second Bayer image 1030.

The image processing apparatus may restore the input image to a color image by interpolating colors for each of pixels of the second Bayer image.

Figure 11:
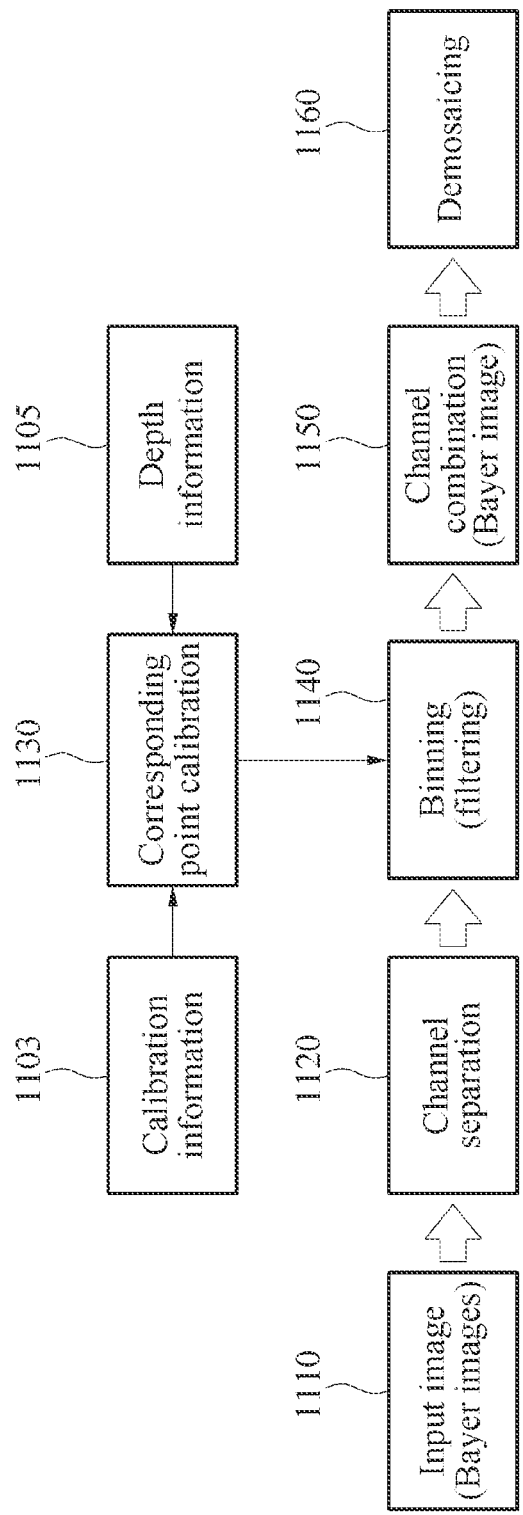
FIG. 11 is a flowchart illustrating an example of a method of processing an image.

FIG. 11 is a flowchart illustrating an example of a method of processing an image. In the following examples, operations may be performed sequentially, but not necessarily performed sequentially. For example, the order of the operations may be changed and at least two of the operations may be performed in parallel.

Referring to FIG. 11, a process in which an image processing apparatus calculates corresponding points of each pixel for each lens through operations 1110 to 1160 and restores an image through binning based on the corresponding points is illustrated.

In operation 1110, the image processing apparatus may receive an input image. The input image may be, for example, an image captured by an ALC including a plurality of lenses. For example, when the ALC includes four lenses, the input image may be the same as an image captured by four adjacent cameras. The input image may include Bayer images corresponding to the four lenses. For example, a Bayer image may have a Bayer pattern of R, G, G, B.

In operation 1120, the image processing apparatus may generate channel separation images Rn, Gn, Gn, and Bn by separating the input image, for example, each Bayer image by a plurality of channels (e.g., R, G, G, and B channels).

In operation 1130, the image processing apparatus may calculate a corresponding point in each of the channel separation images, based on calibration information 1103 of a camera (e.g., an ALC) and depth information 1105 calculated based on AF data of the camera. The calibration information 1103 of the camera may be stored in advance by performing camera calibration on an ALC offline.

The ALC may include four lenses as described above, and accordingly it may be interpreted that the ALC has a structure in which four cameras are adjacent to each other. The structure may indicate that calibration on the four cameras (lenses) may be performed.

The image processing apparatus of one or more embodiments may more simply find a corresponding point based on depth information on a depth from a camera (lenses) to a subject, compared to a typical image processing apparatus. The image processing apparatus of one or more embodiments may obtain the calibration information 1103 that includes, for example, movement information and rotation information of lenses, lens distortion information of lenses, and focus and center information of lenses. The image processing apparatus may perform calibration on four lenses, to calculate a lens distortion parameter indicating lens distortion information, an intrinsic parameter indicating focus and center information of each lens, and an extrinsic parameter indicating rotation and movement information of each lens. The image processing apparatus may perform calibration using, for example, a check pattern generally used in camera calibration.

When an AF function is performed, the image processing apparatus may calculate the depth information 1105 between the subject and the camera, based on motor step information indicating a point at which a subject is in focus. The image processing apparatus may calculate a distance between the subject and the camera, that is, the depth information 1105, by a distance conversion equation that converts the motor step information to a corresponding distance.

The image processing apparatus may analyze characteristics of the camera based on the calibration information 1103, and calculate corresponding points based on the depth information 1105 using the method described above with reference to FIGS. 6 to 7B.

In operation 1140, the image processing apparatus may perform binning using four images generated for each channel based on the corresponding points calculated in operation 1130. The image processing apparatus may perform binning using the method described above with reference to FIGS. 8 to 9B.

In operation 1150, the image processing apparatus may generate a Bayer image (e.g., a second Bayer image) again by combining channels of binned images generated in operation 1140.

In operation 1160, the image processing apparatus may apply demosaicing and transform a second Bayer image in which each pixel includes one piece of color information such that each pixel includes three pieces of color information, to restore a final image.

Figure 12:
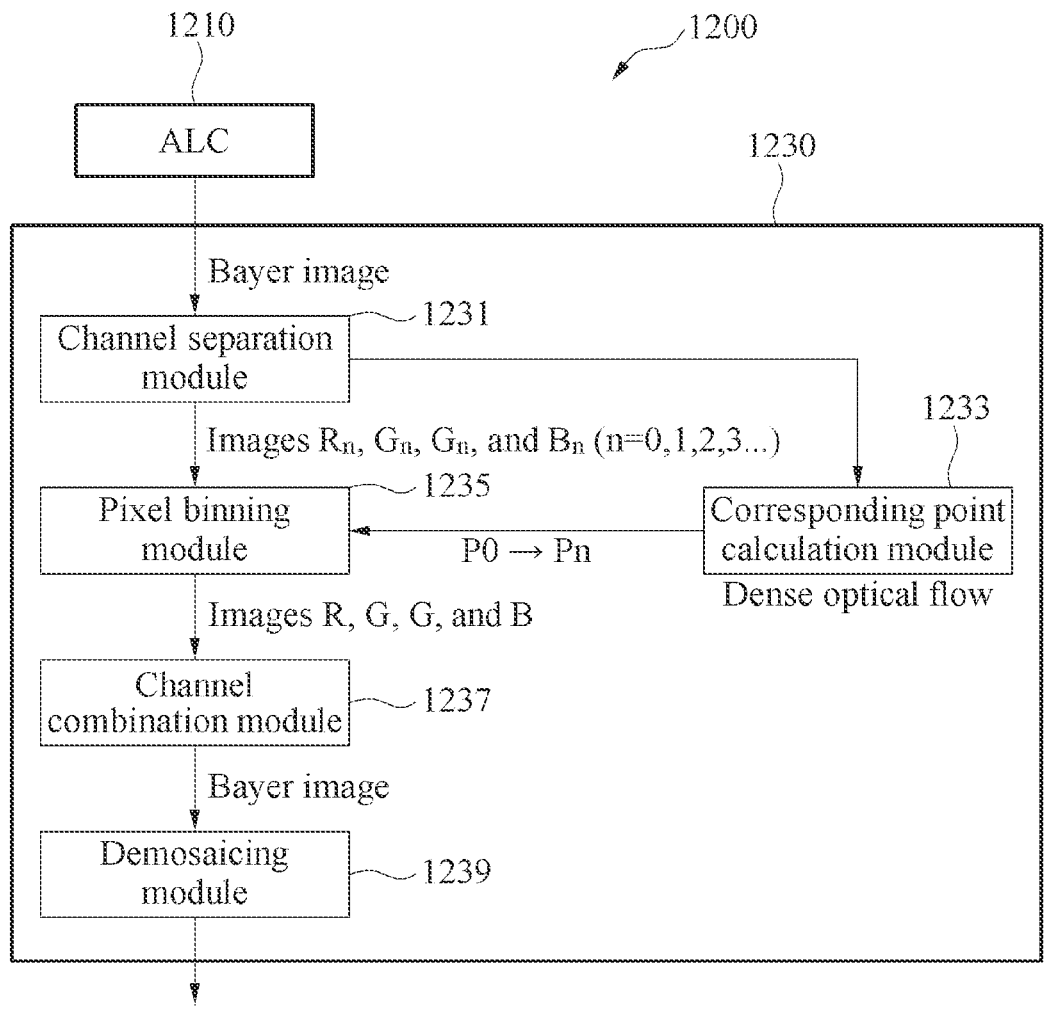
FIGS. 12 to 14 illustrate examples of configurations of image processing apparatuses.

FIG. 12 illustrates an example of a configuration of an image processing apparatus. Referring to FIG. 12, an image processing apparatus 1200 may include an ALC 1210 and an image processor 1230 (e.g., one or more processors) as a computing device.

The ALC 1210 may output a Bayer image including a Bayer pattern as described above.

The image processor 1230 may perform an image processing process described above with reference to FIGS. 3 to 11 on the Bayer image. The image processor 1230 may include a channel separation module 1231, a corresponding point calculation module 1233, a pixel binning module 1235, a channel combination module 1237, and a demosaicing module 1239.

The channel separation module 1231 may separate channels of the Bayer image by lenses of the ALC 1210. For example, when there are "n" lenses, the channel separation module 1231 may separate each Bayer image by channels and generate channel separation images, for example, images Rn, Gn, Gn, and Bn (n=0, 1, 2, 3, . . . ).

The corresponding point calculation module 1233 may calculate corresponding points corresponding to a point at which the same subject is detected (or captured), for each of the plurality of lenses. When pixels in the channel separation images are projected from a 2D image plane of an image sensor to a 3D projection plane of a camera for each of the plurality of lenses, the corresponding point calculation module 1233 may calculate corresponding points such that the pixels are displayed at the same position on a projection plane.

The corresponding point calculation module 1233 may use a dense optical flow scheme of calculating corresponding points of all pixels based on information about an optical flow between channel separation images of each lens, to calculate corresponding points. The optical flow may be a movement pattern of the same object between frames, which may equally be applied to a Bayer image. The corresponding point calculation module 1233 may use, for example, a Farnebäck algorithm.

The pixel binning module 1235 may perform spread pixel binning on the channel separation images Rn, Gn, Gn, and Bn based on the corresponding points calculated by the corresponding point calculation module 1233. The channel separation images Rn, Gn, Gn, and Bn may be changed to images R, G, G, and B binned by the pixel binning module 1235.

The channel combination module 1237 may combine images binned by the pixel binning module 1235 for each channel to generate a second Bayer image.

The demosaicing module 1239 may restore the Bayer image to a color image by interpolating colors for each pixel of the second Bayer image.

The image processor 1230 may be, for example, an image signal processor (ISP) included in a sensor of an ALC 1310, or may be separated from the sensor and included in an application processor (AP).

Figure 13:
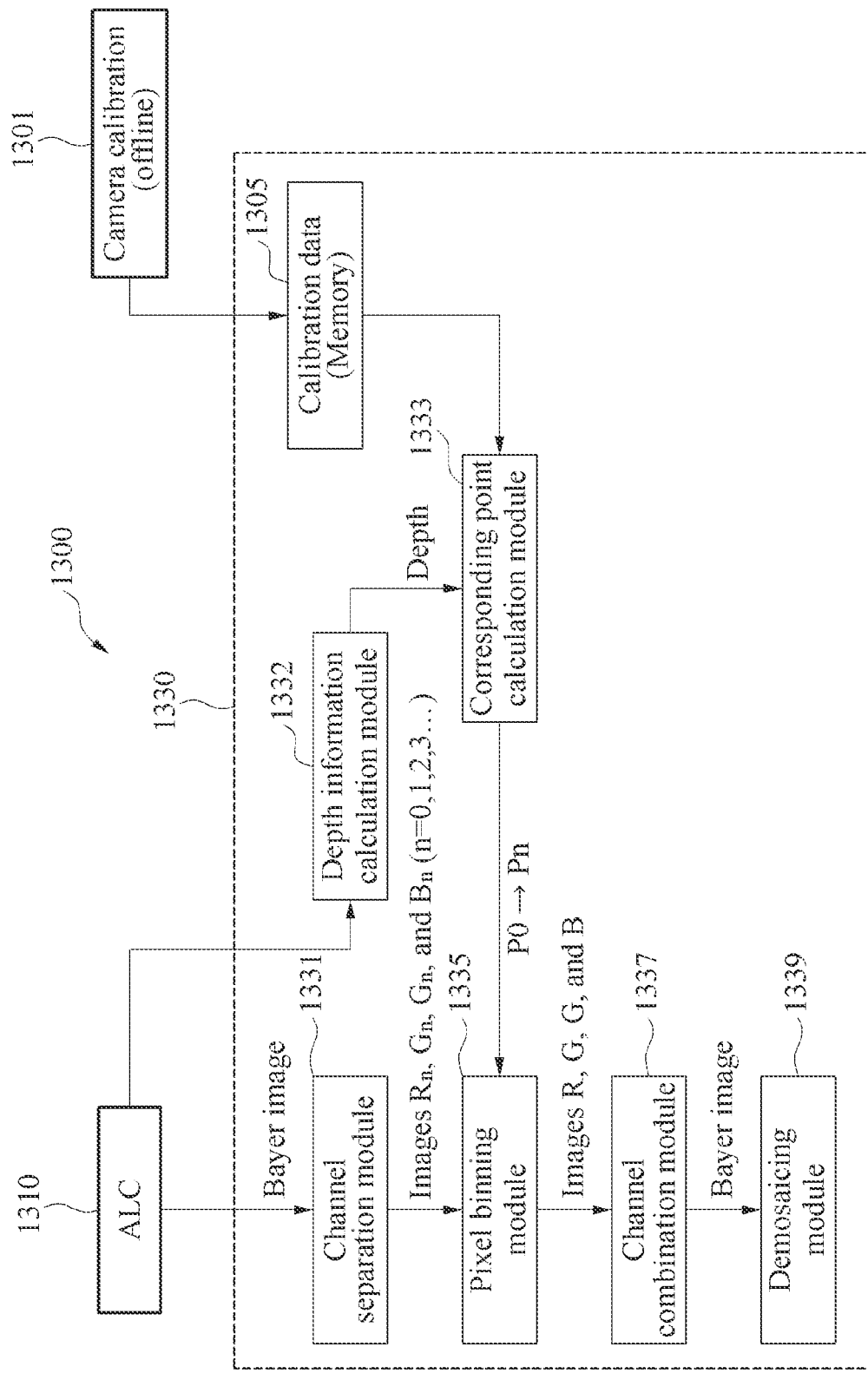

FIG. 13 illustrates another example of a configuration of an image processing apparatus. Referring to FIG. 13, an image processing apparatus 1300 may include the ALC 1310 and an image processor 1330 (e.g., one or more processors). The image processing apparatus 1300 may be, for example, an ISP, but is not limited thereto.

The ALC 1310 may output a Bayer image including a Bayer pattern as described above.

The image processor 1330 may include a channel separation module 1331, a depth information calculation module 1332, a corresponding point calculation module 1333, a pixel binning module 1335, a channel combination module 1337, and demosaicing module 1339. Since an operation of each of the channel separation module 1331, the pixel binning module 1335, the channel combination module 1337, and the demosaicing module 1339 of FIG. 13 is the same as an operation of each of the channel separation module 1231, the pixel binning module 1235, the channel combination module 1237, and the demosaicing module 1239 of FIG. 12, an operation of each of the depth information calculation module 1332 and the corresponding point calculation module 1333 different from the example of FIG. 12 will be mainly described below.

The image processor 1330 may acquire calibration data 1305 of the ALC 1310 through a camera calibration 1301. The camera calibration 1301 may be performed offline using a separate additional device (e.g., a personal computer (PC)), or performed using a separate additional device during a production process of an ALC. The calibration data 1305 may be stored in, for example, a separate memory (e.g., a read-only memory (ROM)). In addition, a LUT used to calculate a corresponding point may be stored in the memory.

The depth information calculation module 1332 may calculate depth information on a depth between a subject and the ALC 1310 from AF data of the ALC 1310 through the process described above with reference to FIG. 11.

The corresponding point calculation module 1333 may calculate corresponding points in channel separation images based on the calibration data 1305 and the depth information calculated by the depth information calculation module 1332.

Figure 14:
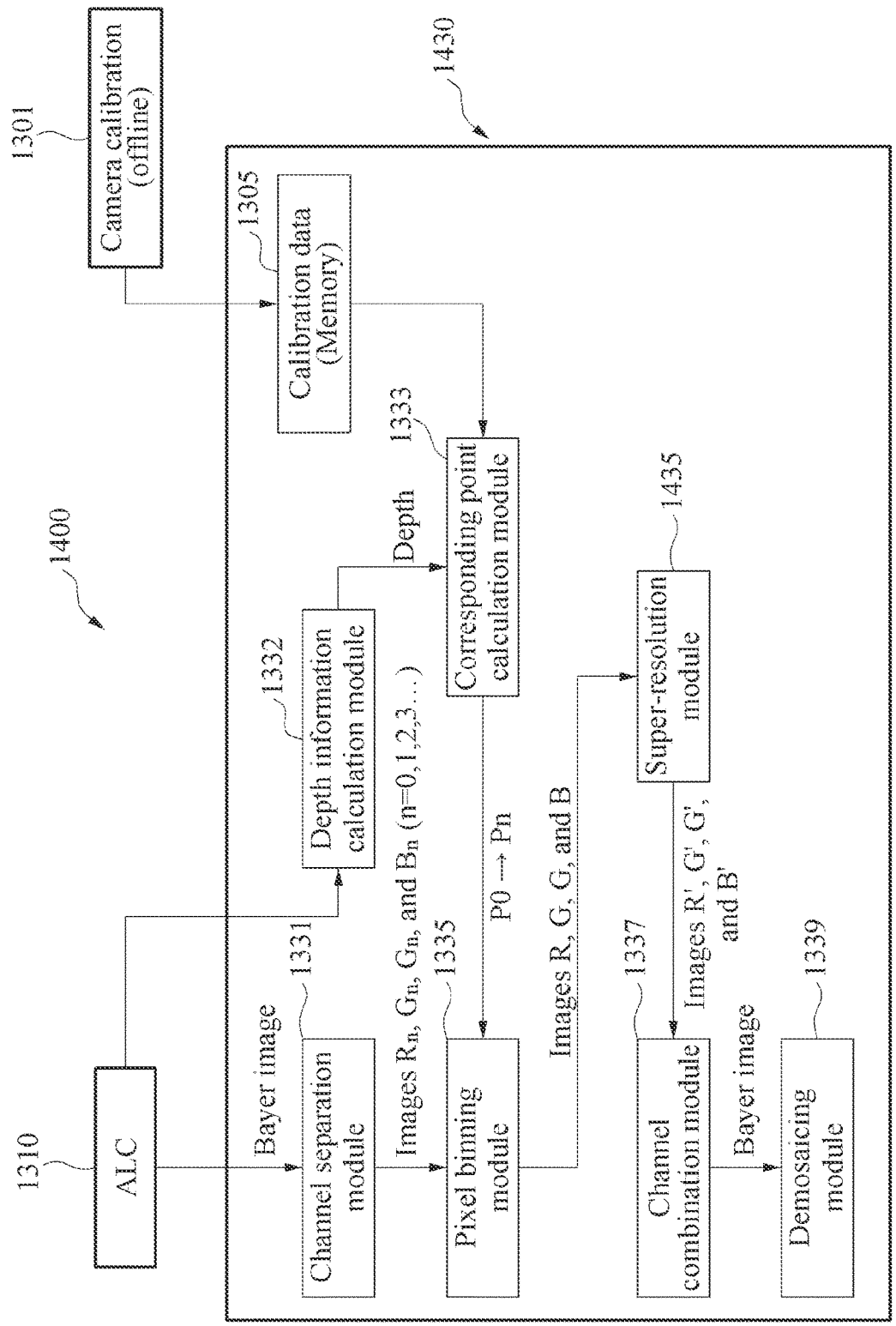

FIG. 14 illustrates another example of a configuration of an image processing apparatus. Referring to FIG. 14, an image processing apparatus 1400 may include the ALC 1310 and an image processor 1430 (e.g., one or more processors), and may be configured by adding a super-resolution module 1435 to restore a high-resolution image to the configuration of FIG. 13. Hereinafter, an operation of the super-resolution module 1435 will be mainly described.

When binning is performed by the pixel binning module 1335, a resolution corresponding to one lens may be obtained. For example, when the ALC 1310 includes four lenses, a resolution of an output image may be reduced to ¼ of the overall resolution of the image sensor through binning. The image processing apparatus 1400 may restore the resolution by up-sampling a resolution of images R, G, G, and B binned by the pixel binning module 1335 to be doubled horizontally and vertically through the super-resolution module 1435.

The channel combination module 1337 may generate a second Bayer image by combining the channel separation images with the resolution restored through the super-resolution module 1435.

Figure 15:
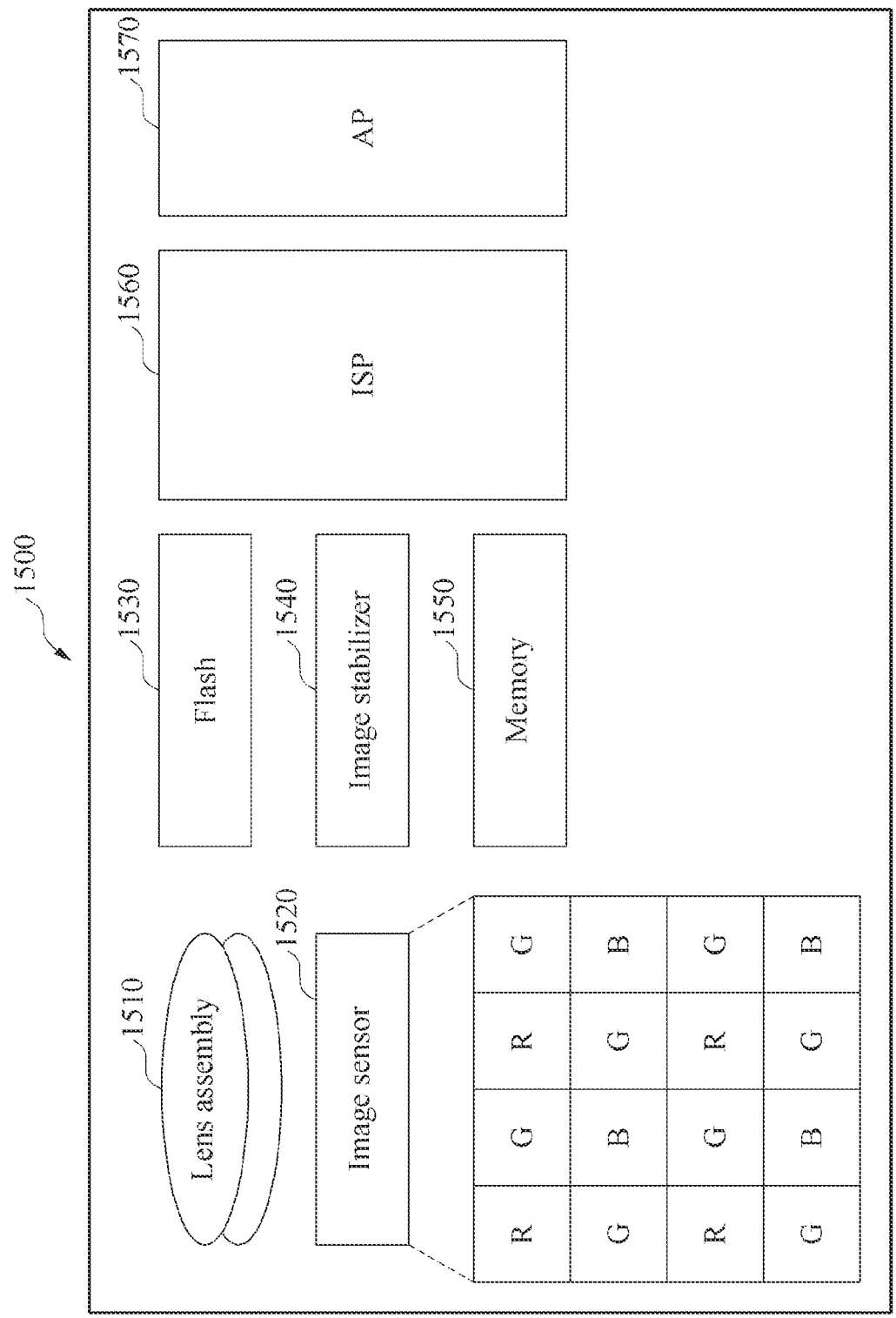
FIG. 15 illustrates an example of an electronic device including an image processing apparatus.

FIG. 15 illustrates an example of an electronic device including an image processing apparatus. Referring to FIG. 15, an electronic device 1500 may include a lens assembly 1510, an image sensor 1520, a flash 1530, an image stabilizer 1540, a memory 1550 (e.g., one or more memories), and an ISP 1560, and an AP 1570. The lens assembly 1510, the image sensor 1520, the flash 1530, the image stabilizer 1540, the memory 1550, and the ISP 1560 may also be referred to as a "camera module".

The lens assembly 1510 may collect light emitted from a subject of which image is to be captured. The lens assembly 1510 may be disposed above the image sensor 1520 to collect light emitted from a subject and transmit the light to pixels of the image sensor 1520. The lens assembly 1510 may include one or more lenses. A portion of a plurality of lens assemblies 1510 may have the same lens attribute (e.g., an angle of view, a focal length, auto-focusing, an f number, or an optical zoom), or at least one lens assembly may have one or more lens attributes different from those of another lens assembly. The lens assembly 1510 may include, for example, a wide-angle lens or a telephoto lens.

The image sensor 1520 may obtain an image corresponding to a subject by converting light emitted or reflected from the subject and transmitted via the lens assembly 1510 into an electrical signal. The image sensor 1520 may include, for example, one image sensor selected from among image sensors having different attributes, for example, an RGB sensor, a black-and-white (BW) sensor, an infrared (IR) sensor, or an ultraviolet (UV) sensor, a plurality of image sensors having the same attribute, or a plurality of image sensors having different attributes. Each image sensor included in the image sensor 1520 may be implemented using, for example, a charged coupled device (CCD) sensor or a complementary metal-oxide-semiconductor (CMOS) sensor.

The flash 1530 may emit light that is used to reinforce light emitted or reflected from a subject. For example, the flash 1530 may include one or more light-emitting diodes (LEDs) (e.g., a red-green-blue (RGB) LED, a white LED, an IR LED, or a UV LED), or a xenon lamp.

The image stabilizer 1540 may move the image sensor 1520 of at least one lens included in the lens assembly 1510 in a predetermined direction, or control an operation characteristic (e.g., adjust the read-out timing) of the image sensor 1520, in response to a movement of a camera or an image processing apparatus including the camera. The image stabilizer 1540 may compensate for at least a portion of a negative effect caused by a movement for a captured image. The image stabilizer 1540 may sense a movement of a camera module or the electronic device 1500 using a gyro sensor (not shown) or an acceleration sensor (not shown) disposed inside or outside the camera module. The image stabilizer 1540 may be implemented as, for example, an optical image stabilizer.

The memory 1550 may at least temporarily store at least a portion of an image obtained through the image sensor 1520 for a subsequent image processing task. For example, if image capturing is delayed due to shutter lag or a plurality of images are quickly acquired, an obtained raw image (e.g., a Bayer-patterned image, or a high-resolution image) may be stored in the memory 1550, and its corresponding copy image (e.g., a low-resolution image) may be previewed via a display (e.g., a display 1650 of FIG. 16). Thereafter, if a specified condition is met (e.g., by a user's input or system command), at least a portion of the raw image stored in the memory 1550 may be transmitted to the ISP 1560 and processed by the ISP 1560.

In an example, the memory 1550 may be configured as at least a portion of a memory (e.g., a memory 1670 of FIG. 16) of the electronic device 1500, or a separate memory operated independently of the memory 1670.

The ISP 1560 may perform one or more image processing operations on an image obtained via the image sensor 1520 or an image stored in the memory 1550. The image processing operations may include, for example, depth map generation, 3D modeling, panorama generation, feature point extraction, image synthesizing, or image compensation (e.g., noise reduction, resolution adjustment, brightness adjustment, blurring, sharpening, or softening), but are not limited thereto.

The ISP 1560 may correspond to, for example, the image processing apparatus 1300 described above with reference to FIG. 13 or the image processing apparatus 1400 described above with reference to FIG. 14.

The ISP 1560 may be configured as at least a portion of the AP 1570, or as a separate processor operated independently of the AP 1570. If the ISP 1560 is configured as a separate processor from the AP 1570, at least one image processed by the ISP 1560 may be displayed, by the AP 1570, via the electronic device 1500 without a change or after being further processed.

For example, operations 1120 to 1150 described above with reference to FIG. 11 may be performed by the ISP 1560, and operation 1160 may be performed by the AP 1570.

Figure 16:
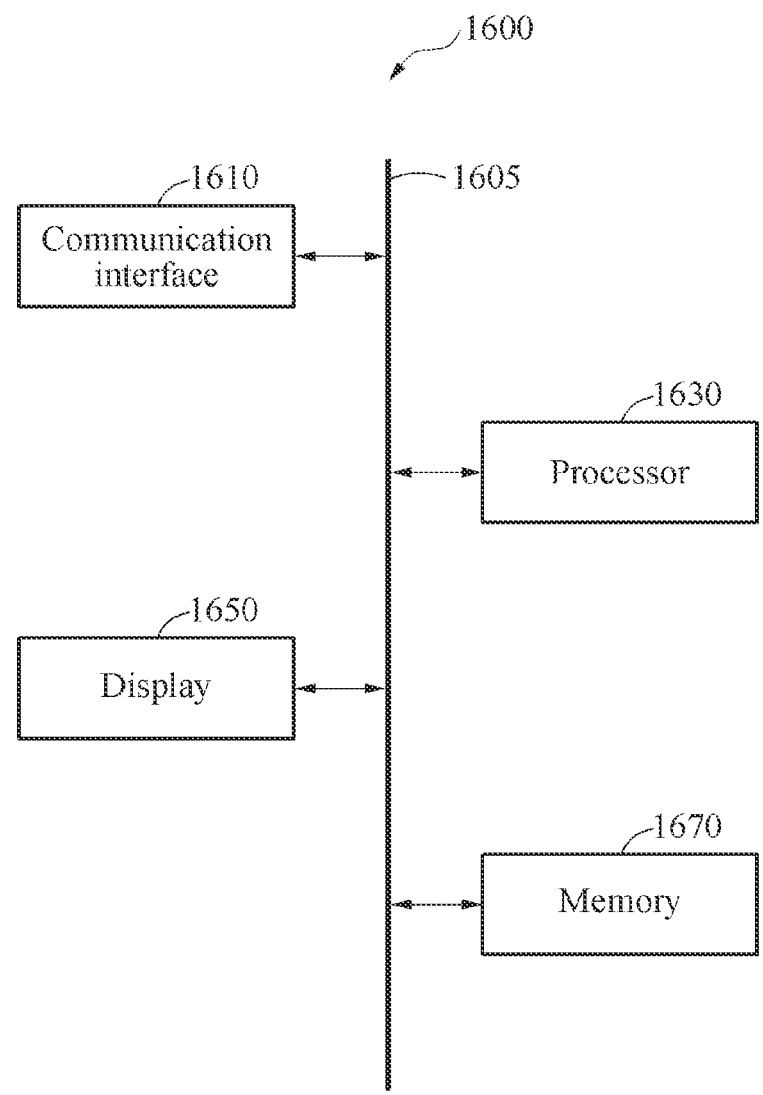
FIG. 16 illustrates an example of an image processing apparatus.

FIG. 16 illustrates an example of an image processing apparatus. Referring to FIG. 16, an image processing apparatus 1600 may include a communication interface 1610, a processor 1630 (e.g., one or more processors), the display 1650, and the memory 1670 (e.g., one or more memories). The communication interface 1610, the processor 1630, the display 1650, and the memory 1670 may be connected to each other via a communication bus 1605.

The communication interface 1610 may receive an input image including Bayer images captured by a plurality of lenses included in a lens assembly. The communication interface 1610 may receive, for example, an input image from a camera module included in the image processing apparatus 1600, or receive an input image from the outside of the image processing apparatus 1600.

The processor 1630 may generate channel separation images by separating a Bayer image by a plurality of channels. The processor 1630 may calculate corresponding points such that pixels in the channel separation images are displayed at the same position on a projection plane, for each of the plurality of lenses. The processor 1630 may perform binning on the channel separation images based on the corresponding points. The processor 1630 may restore the input image for each of the plurality of lenses based on binned images generated by performing the binning.

The processor 1630 may execute a program and control the image processing apparatus 1600. A code of the program to be executed by the processor 1630 may be stored in the memory 1670.

The display 1650 may output the input image restored by the processor 1630. The display 1650 may be, for example, a touch display and/or a flexible display, but is not limited thereto.

The memory 1670 may store the input image received through the communication interface 1610, and/or the input image restored by the processor 1630. Also, the memory 1670 may store the corresponding points calculated by the processor 1630 or a LUT of the corresponding points.

The memory 1670 may store a variety of information generated in a processing process of the processor 1630 described above. In addition, the memory 1670 may store a variety of data and programs. The memory 1670 may include, for example, a volatile memory or a non-volatile memory. The memory 1670 may include a high-capacity storage medium such as a hard disk to store a variety of data.

The image processing apparatus 1600 may include devices in various fields, such as, for example, an advanced driver-assistance system (ADAS), a head-up display (HUD), a 3D digital information display (DID), a navigation device, a neuromorphic device, a 3D mobile device, a smartphone, a smart television (TV), a smart vehicle, an Internet of Things (IoT) device, a medical device, a measurement device, and the like. Here, the 3D mobile device may be construed as including all display devices, for example, a display device for displaying augmented reality (AR), virtual reality (VR), and/or mixed reality (MR), a head-mounted display (HMD), a face-mounted display (FMD), AR glasses, and the like.

In addition, the processor 1630 may perform the at least one method described with reference to FIGS. 1 to 15 or a scheme corresponding to the at least one method. The processor 1630 may be a hardware-implemented image processing apparatus having a circuit that is physically structured to execute desired operations. For example, the desired operations may include codes or instructions included in a program. The hardware-implemented image processing apparatus 1600 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The single lenses, pixel structures, lenses, Bayer patterns, image processing apparatuses, ALCs, image processors, channel separation modules, corresponding point calculation modules, pixel binning modules, channel combination modules, demosaicing modules, depth information calculation modules, super-resolution modules, electronic devices, lens assemblies, image sensors, flashes, image stabilizers, memories, ISPs, APs, communication interfaces, displays, communication buses, single lens 105, pixel structure 110, lenses 120, pixel structure 130, Bayer pattern 419, Bayer pattern 1010, image processing apparatus 1200, ALC 1210, image processor 1230, channel separation module 1231, corresponding point calculation module 1233, pixel binning module 1235, channel combination module 1237, demosaicing module 1239, image processing apparatus 1300, ALC 1310, channel separation module 1331, depth information calculation module 1332, corresponding point calculation module 1333, pixel binning module 1335, channel combination module 1337, demosaicing module 1339, image processing apparatus 1400, super-resolution module 1435, electronic device 1500, lens assembly 1510, image sensor 1520, flash 1530, image stabilizer 1540, memory 1550, ISP 1560, AP 1570, image processing apparatus 1600, communication interface 1610, processor 1630, display 1650, memory 1670, communication bus 1605, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with image processing, the method comprising:
receiving an input image including Bayer images captured by a plurality of lenses included in a lens assembly;
generating channel separation images by separating each of the Bayer images by a plurality of channels;
determining corresponding points such that pixels in the channel separation images are displayed at the same position on a projection plane, for each of the plurality of lenses;
performing binning on the channel separation images, based on a brightness difference and a distance difference between a target corresponding point and a center of a pixel including the target corresponding point, corresponding to each of the corresponding points in channel separation images that correspond to a same channel and that are combined into one image, for each of the plurality of lenses;
restoring the input image for each of the plurality of lenses based on binned images generated by performing the binning; and
outputting the restored input image.

2. The method of claim 1, wherein the determining of the corresponding points comprises determining the corresponding points of the pixels based on an optical flow in the channel separation images.

3. The method of claim 1, wherein the determining of the corresponding points comprises determining the corresponding points of the pixels for each of the plurality of lenses based on depth information and calibration information for each of the plurality of lenses.

4. The method of claim 3, wherein the determining of the corresponding points comprises:
calling a lookup table (LUT) that stores corresponding points of a portion of the pixels at a predetermined distance among the pixels, for each of the plurality of lenses; and
determining the corresponding points of the pixels by interpolating the corresponding points of the portion of the pixels stored in the LUT.

5. The method of claim 1, wherein the performing of the binning comprises performing binning on the channel separation images based on a probability value according to characteristics of the corresponding points comprising the distance difference and the brightness difference in the channel separation images that correspond to the same channel and that are combined into the one image, for each of the plurality of lenses.

6. The method of claim 1, wherein the performing of the binning comprises:
determining a weight based on the distance difference and the brightness difference, or based on a gradient difference between the center of the pixel and the target corresponding point, the distance difference and the brightness difference, corresponding to each of the corresponding points in the channel separation images combined into the one image, for each of the plurality of lenses; and
determining a weighted average of the corresponding points for each of the plurality of lenses, based on the weight.

7. The method of claim 1, wherein the restoring of the input image comprises:
generating a second Bayer image by combining the binned images for each channel, corresponding to the plurality of lenses; and
restoring the input image to a color image by interpolating a color for each of pixels of the second Bayer image.

8. The method of claim 7, wherein the generating of the second Bayer image comprises generating the second Bayer image by combining channels of the binned images so that each of the channels of the binned images has a Bayer pattern.

9. The method of claim 1, further comprising:
restoring a resolution by up-sampling the binned images for each of the plurality of lenses,
wherein the restoring of the input image comprises:
generating a second Bayer image by combining images with the restored resolution; and
restoring the input image to a color image by interpolating a color for each of pixels of the second Bayer image.

10. The method of claim 1, wherein the generating of the channel separation images comprises separating each of the Bayer images by the plurality of channels by placing each of the Bayer images in corresponding pixels for each of a plurality of channels included in a Bayer pattern.

11. A non-transitory computer-readable storage medium storing instructions that, when executed by one or more processors, configure the one or more processors to perform the method of claim 1.

12. An apparatus with image processing, the apparatus comprising:
a communication interface configured to receive an input image including Bayer images captured by a plurality of lenses included in a lens assembly;
one or more processors configured to
generate channel separation images by separating each of the Bayer images by a plurality of channels,
determine corresponding points such that pixels in the channel separation images are displayed at the same position on a projection plane, for each of the plurality of lenses,
perform binning on the channel separation images, based on a brightness difference and a distance difference between a target corresponding point and a center of a pixel including the target corresponding point, corresponding to each of the corresponding points in channel separation images that correspond to a same channel and that are combined into one image, for each of the plurality of lenses, and
restore the input image for each of the plurality of lenses based on binned images generated by performing the binning; and
a display configured to output the restored input image.

13. The apparatus of claim 12, wherein, for the determining of the corresponding points, the one or more processors are configured to determine the corresponding points of the pixels for each of the plurality of lenses based on depth information and calibration information for each of the plurality of lenses.

14. The apparatus of claim 13, wherein, for the determining of the corresponding points, the one or more processors are configured to:
call a lookup table (LUT) that stores corresponding points of a portion of the pixels at a predetermined distance among the pixels, for each of the plurality of lenses; and
determine the corresponding points of the pixels by interpolating the corresponding points of the portion of the pixels stored in the LUT.

15. The apparatus of claim 12, wherein, for the performing of the binning, the one or more processors are configured to perform binning on the channel separation images based on a probability value according to characteristics of the corresponding points comprising the distance difference and the brightness difference in the channel separation images that correspond to the same channel and that are combined into the one image, for each of the plurality of lenses.

16. The apparatus of claim 12, wherein, for the performing of the binning, the one or more processors are configured to:
determine a weight based on the distance difference and the brightness difference, or based on a gradient difference between the center of the pixel and the target corresponding point, the distance difference and the brightness difference, corresponding to each of the corresponding points in the channel separation images combined into the one image, for each of the plurality of lenses; and
determine a weighted average of the corresponding points for each of the plurality of lenses, based on the weight.

17. The apparatus of claim 12, wherein, for the restoring of the input image, the one or more processors are configured to:
generate a second Bayer image by combining the binned images for each channel, corresponding to the plurality of lenses; and
restore the input image to a color image by interpolating a color for each of pixels of the second Bayer image.

18. The apparatus of claim 12, wherein the one or more processors are configured to:
restore a resolution by up-sampling the binned images for each of the plurality of lenses; and
for the restoring of the input image,
generate a second Bayer image by combining images with the restored resolution; and
restore the input image to a color image by interpolating a color for each of pixels of the second Bayer image.

19. A method with image processing, the method comprising:
determining a plurality of images, wherein each image corresponds to a different lens among a plurality of lenses;
determining corresponding points corresponding to a same portion of an image subject in each of the images;
for each of the images, determining one or more differences between the corresponding point of the image and a center of a pixel of the image including the corresponding point; and
generating a restored input image by performing binning on the images based on the determined differences.

20. The method of claim 19, wherein, for each of the images, the one or more differences comprises any one or any combination of any two or more of a brightness difference, a distance difference, and a gradient difference.

21. The method of claim 20, wherein, for each of the images, the determining of the one or more differences comprises:
determining the brightness difference and the distance difference in response to a distance from the image subject to the lenses being within a range of a focal point of the lenses; and
determining the brightness difference, the distance difference, and the gradient difference in response to the distance from the image subject to the lenses being outside the range.

22. The method of claim 19, further comprising determining a weighted average based on the one or more differences determined for the images,
wherein the performing of the binning comprises performing the binning based on the determined weighted average.

23. The method of claim 19, wherein the lenses are included in an array lens camera (ALC), and the images correspond to a same color channel.

24. The method of claim 19, wherein the determining of the images comprises determining the images using any one or any combination of any two or more of a red-green-blue (RGB) sensor, a black-and-white (BW) sensor, an infrared (IR) sensor, and an ultraviolet (UV) sensor corresponding to the lenses.

25. A method with image processing, the method comprising:
determining a plurality of images of a subject at a distance from an array lens camera (ALC), wherein each image corresponds to a different lens among lenses of the ALC;
determining corresponding points corresponding to a same portion of the subject in each of the images, based on predetermined corresponding points of a look up table (LUT); and
generating a restored input image by performing binning based on the determined corresponding points.

26. The method of claim 25, wherein
the distance is greater than a first distance from the ALC and less than a second distance from the ALC, and
the predetermined corresponding points of the LUT comprise first corresponding points corresponding to a same portion of a subject at the first distance in each of a plurality of first images and second corresponding points corresponding to a same portion of a subject at the second distance in each of a plurality of second images.

27. The method of claim 26, wherein the determining of the corresponding points comprises interpolating the first corresponding points and the second corresponding points.

* * * * *